US012792449B2

(12) United States Patent
Donlan

(10) Patent No.: US 12,792,449 B2
(45) Date of Patent: Nov. 10, 2026

(54) NATURAL LANGUAGE TRIAGE AND ERROR CORRECTION USING DEEP LEARNING

(71) Applicant: Truist Bank, Charlotte, NC (US)

(72) Inventor: Matthew Laine Donlan, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 60 days.

(21) Appl. No.: 19/007,617

(22) Filed: Jan. 2, 2025

(65) Prior Publication Data

US 2026/0186887 A1 Jul. 2, 2026

(51) Int. Cl.
*G06F 11/00* (2006.01)
*G06F 11/07* (2006.01)
*G06F 40/279* (2020.01)

(52) U.S. Cl.
CPC ........ *G06F 11/079* (2013.01); *G06F 11/0787* (2013.01); *G06F 11/0793* (2013.01); *G06F 40/279* (2020.01)

(58) Field of Classification Search
CPC ............... G06F 11/079; G06F 11/0787; G06F 11/0793; G06F 40/279
See application file for complete search history.

(56) References Cited

U.S. PATENT DOCUMENTS

2019/0163553 A1* 5/2019 Ramegowda ....... G06F 16/3344
2023/0074406 A1* 3/2023 Baeuml ............. G06F 16/90332
2024/0248919 A1* 7/2024 Kumar .................. G06F 16/243
2025/0045148 A1* 2/2025 Acharya ............... G06F 11/079
2025/0117282 A1* 4/2025 Bhukar ............... G06F 11/0793
2025/0150364 A1* 5/2025 Vasseur ................. G06F 40/284
2025/0165330 A1* 5/2025 Venkatachalam ..... G06F 11/079
2025/0173330 A1* 5/2025 Durg ..................... G06F 16/243
2025/0238299 A1* 7/2025 Balaka ................ G06F 11/0769
2025/0245120 A1* 7/2025 Bao ..................... G06F 11/3476
2025/0298685 A1* 9/2025 Settle .................... G06F 11/079
2025/0298687 A1* 9/2025 Mazza-Anthony .......................... G06F 11/0793
2025/0370846 A1* 12/2025 McCurdy .............. G06F 11/079
2025/0371552 A1* 12/2025 Harris ................... G06F 16/243
2026/0023638 A1* 1/2026 Lavi ...................... G06F 11/079

FOREIGN PATENT DOCUMENTS

EP 4572279 A1 * 6/2025 ............. G06N 20/00

* cited by examiner

*Primary Examiner* — Elmira Mehrmanesh
(74) *Attorney, Agent, or Firm* — Michael A. Springs, Esq.; Shumaker, Loop & Kendrick, LLP; Patrick B. Horne

(57) ABSTRACT

A first application executing on a processor may receive a natural language request comprising an indication of an error associated with a second application or a system. A large language model (LLM) executing on the processor may analyze the natural language request to identify a plurality of components associated with the second application or the system. The LLM may generate, based on a knowledge base, a corrective action associated with a first component of the plurality of components. The first application may initiate performance of the corrective action associated with the first component to correct the error.

17 Claims, 16 Drawing Sheets

NATURAL LANGUAGE TRIAGE AND ERROR CORRECTION USING DEEP LEARNING

BACKGROUND

Natural Language Processing (NLP) is a field of artificial intelligence that focuses on enabling computers to understand, interpret, and generate human language. NLP applications include text analysis, speech recognition, machine translation, sentiment analysis, chatbots, and more.

Large Language Models (LLMs) are advanced NLP systems powered by deep learning algorithms with vast amounts of data for training. These models have shown impressive capabilities in generating coherent language outputs, understanding context, and even performing specific tasks like question-answering or summarization.

Error identification and correction is a problem for enterprises that host applications or otherwise provide computing services. Given the complexity and variability of errors and their potential solutions, limitations of the models, or incorrect assumptions made by the algorithms may not allow the models to correctly identify errors and/or solutions.

BRIEF SUMMARY

Shortcomings of the prior art are overcome and additional advantages are provided through the provision of a computing system and methods for natural language triage and error correction using deep learning.

In various embodiments, natural language triage and error correction using deep learning may be employed to handle errors associated with an application or system. A first application executing on a processor may receive a natural language request that includes information about an error related to a second application or a system. An LLM may analyze this request to identify multiple components linked to the second application or system in question. Based on a knowledge base, the LLM generates a corrective action targeting one of these identified components. The first application initiates and performs the recommended corrective action with the aim of rectifying the error mentioned in the natural language request.

The features, functions, and advantages that have been described herein may be achieved independently in various embodiments of the present disclosure including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
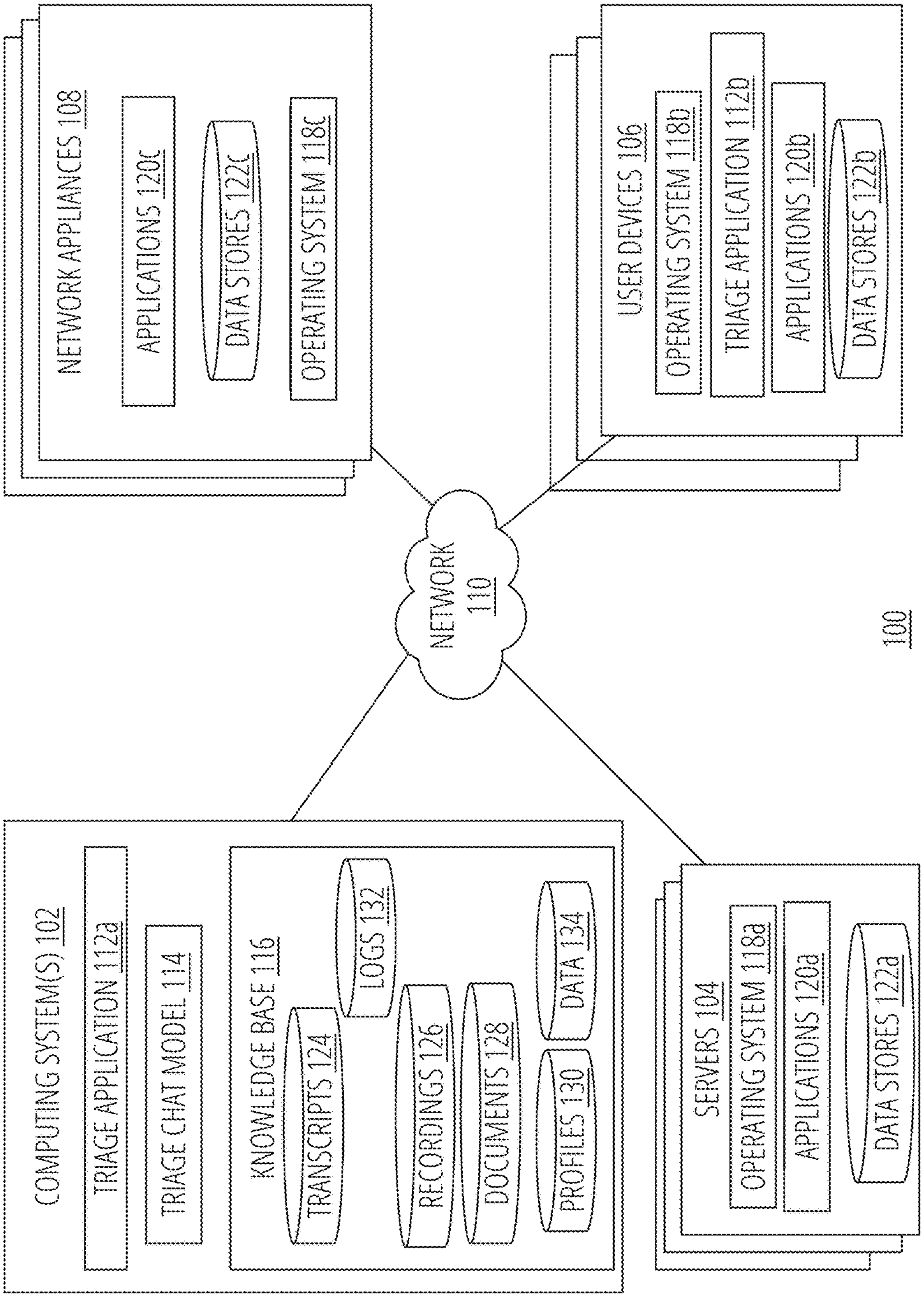

Having thus described embodiments in general terms, reference will now be made to the accompanying drawings, wherein:

FIG. 1 illustrates an aspect of the subject matter in accordance with one embodiment.

Figure 2:
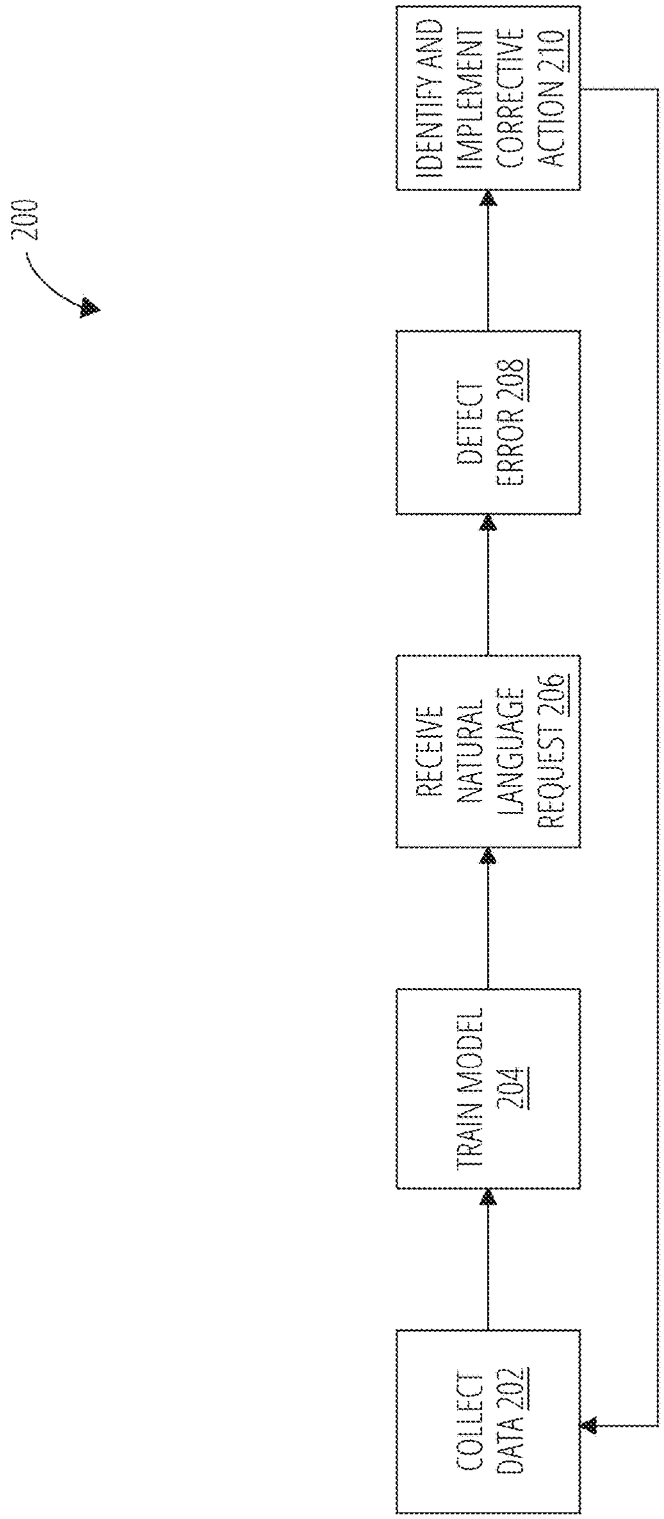

FIG. 2 illustrates an aspect of the subject matter in accordance with one embodiment.

Figure 3A:
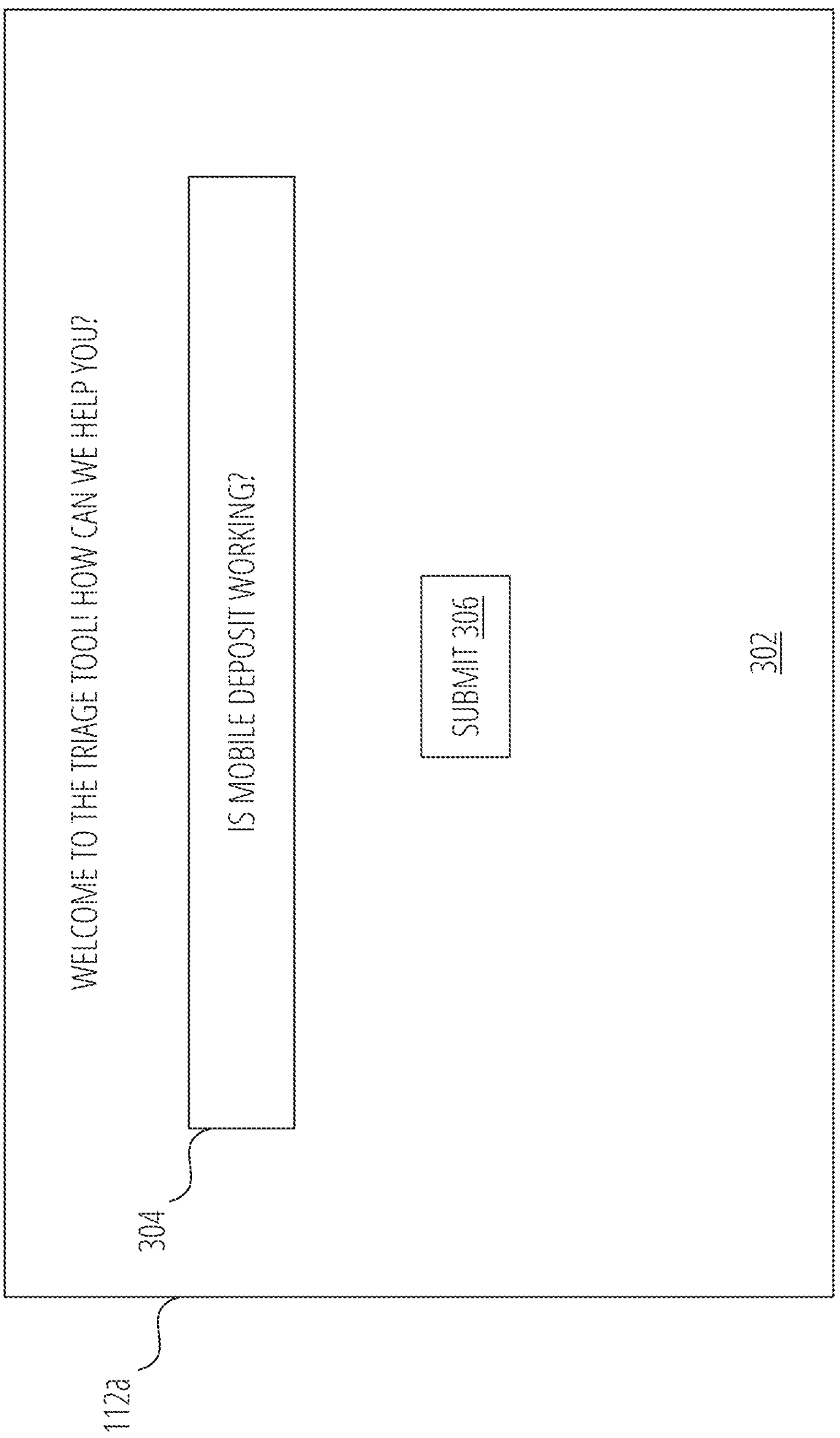

FIG. 3A illustrates an aspect of the subject matter in accordance with one embodiment.

Figure 3B:
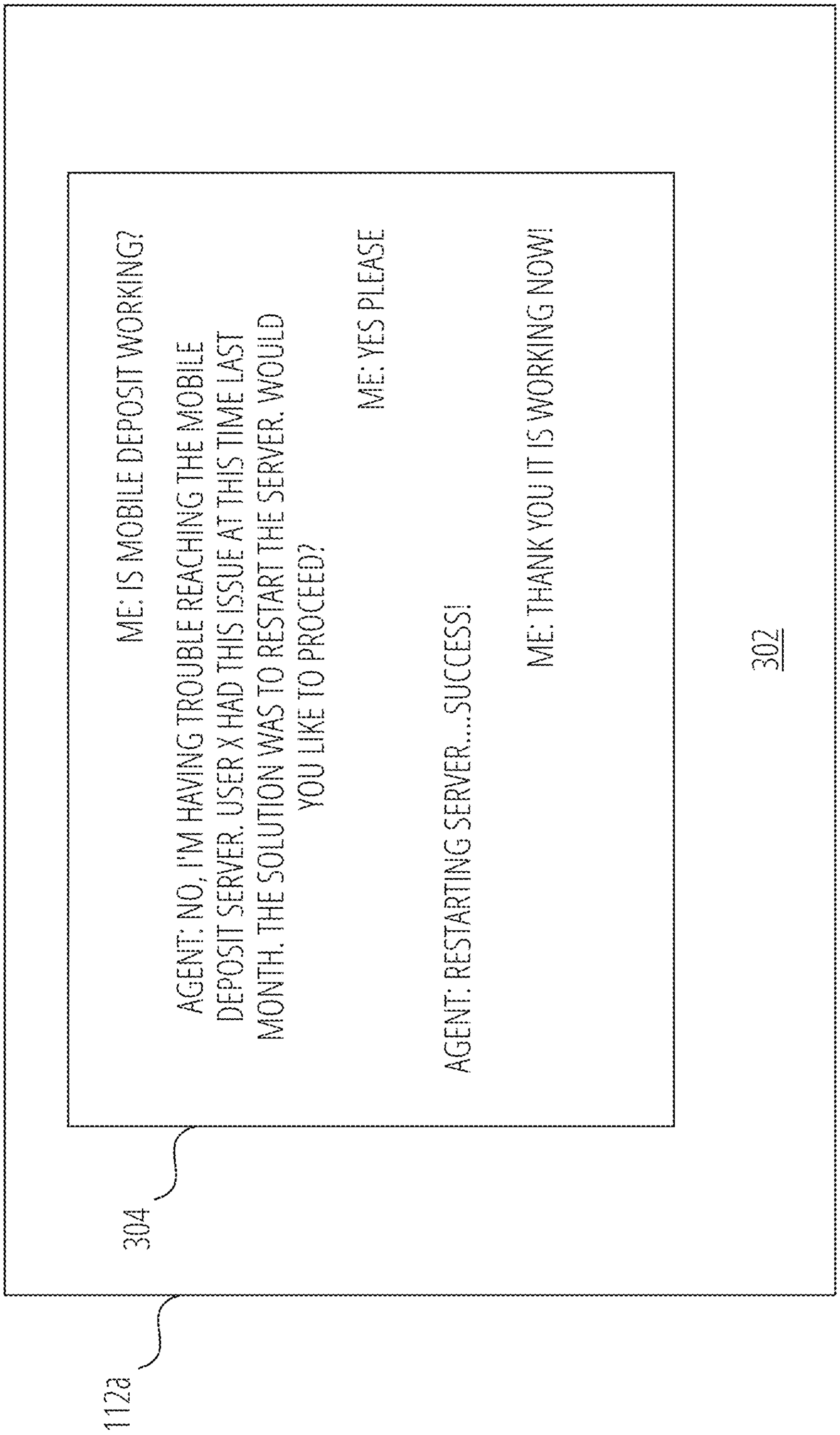

FIG. 3B illustrates an aspect of the subject matter in accordance with one embodiment.

Figure 4A:
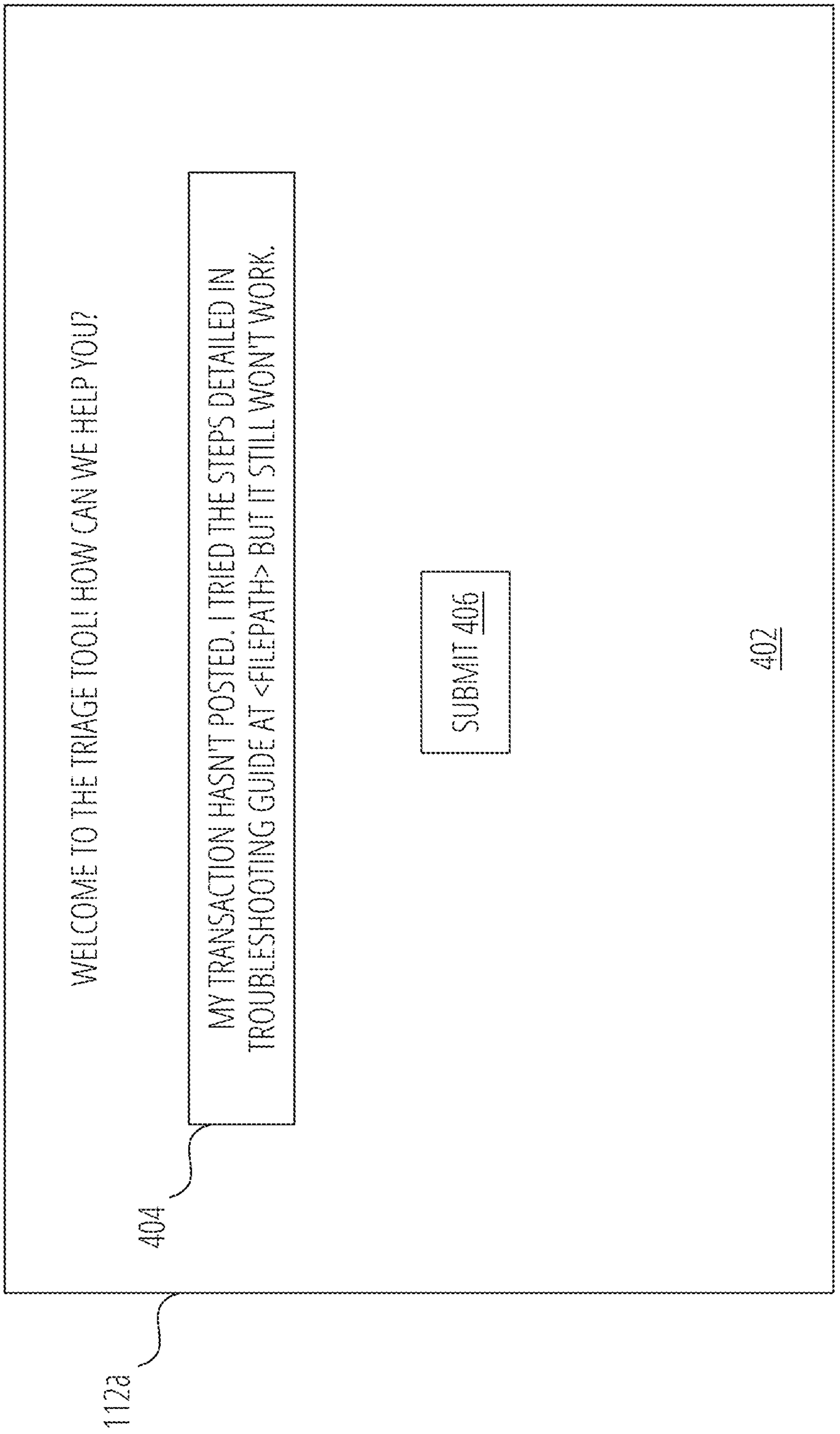

FIG. 4A illustrates an aspect of the subject matter in accordance with one embodiment.

Figure 4B:
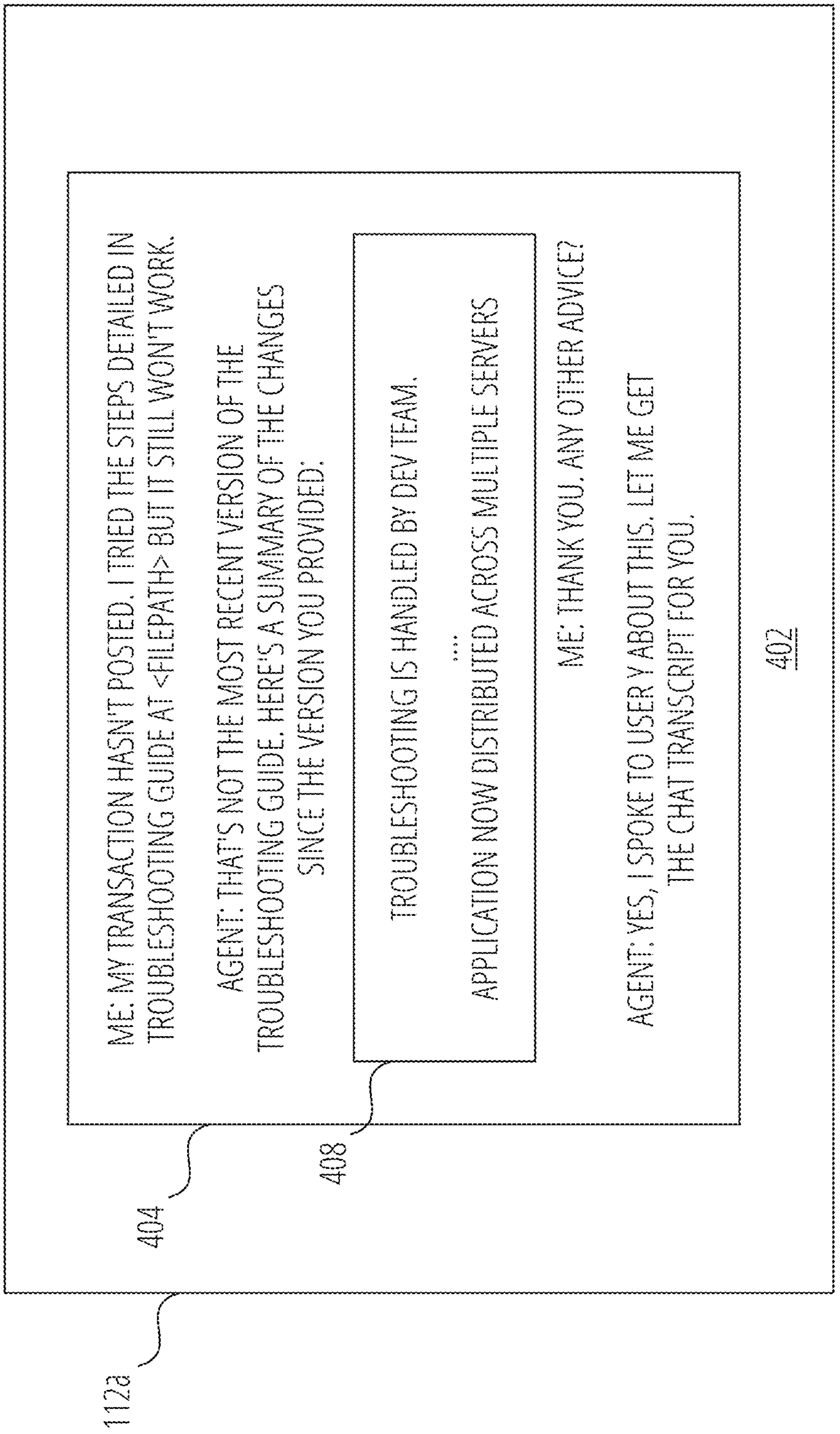

FIG. 4B illustrates an aspect of the subject matter in accordance with one embodiment.

Figure 4C:
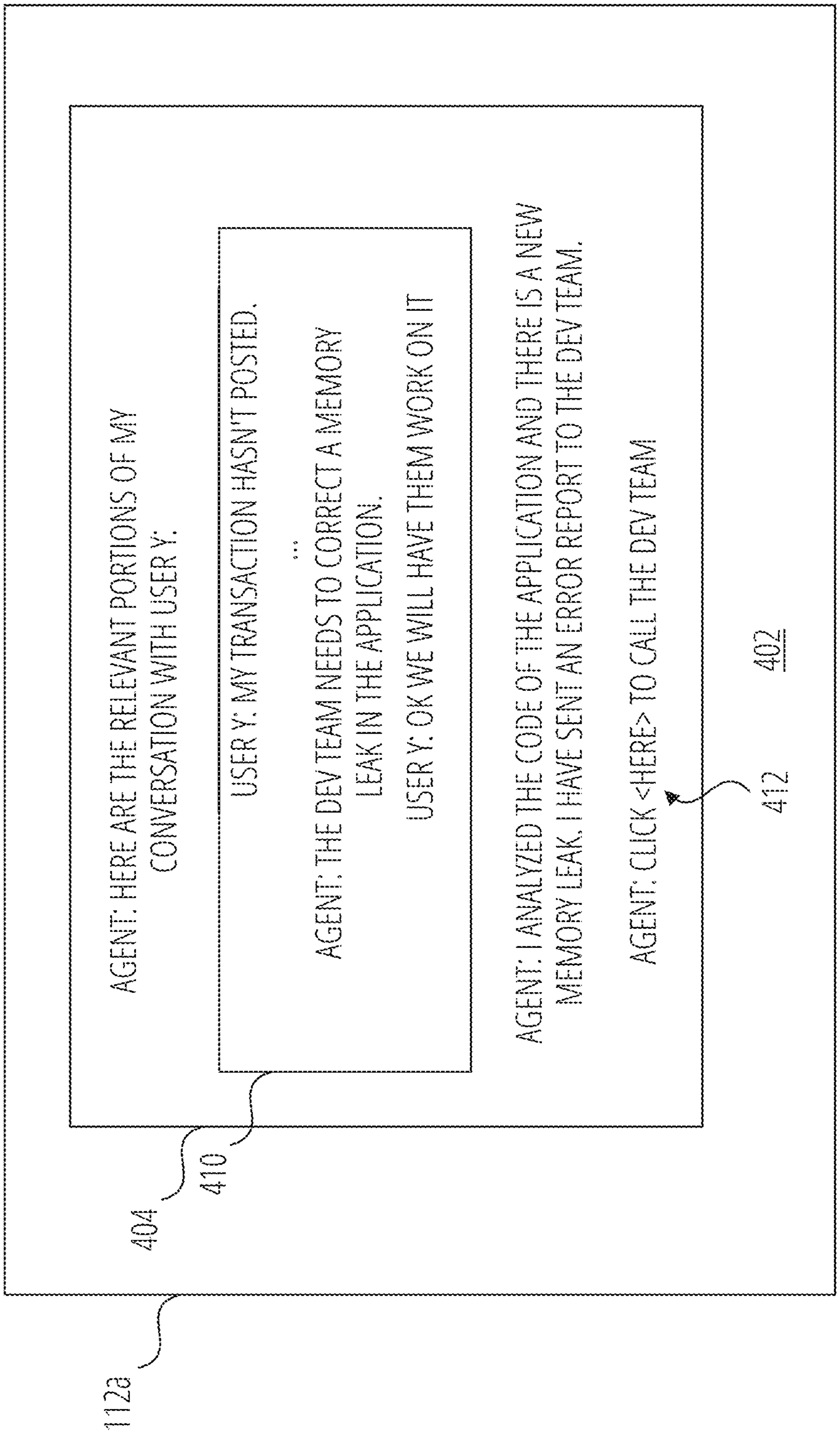

FIG. 4C illustrates an aspect of the subject matter in accordance with one embodiment.

Figure 5:
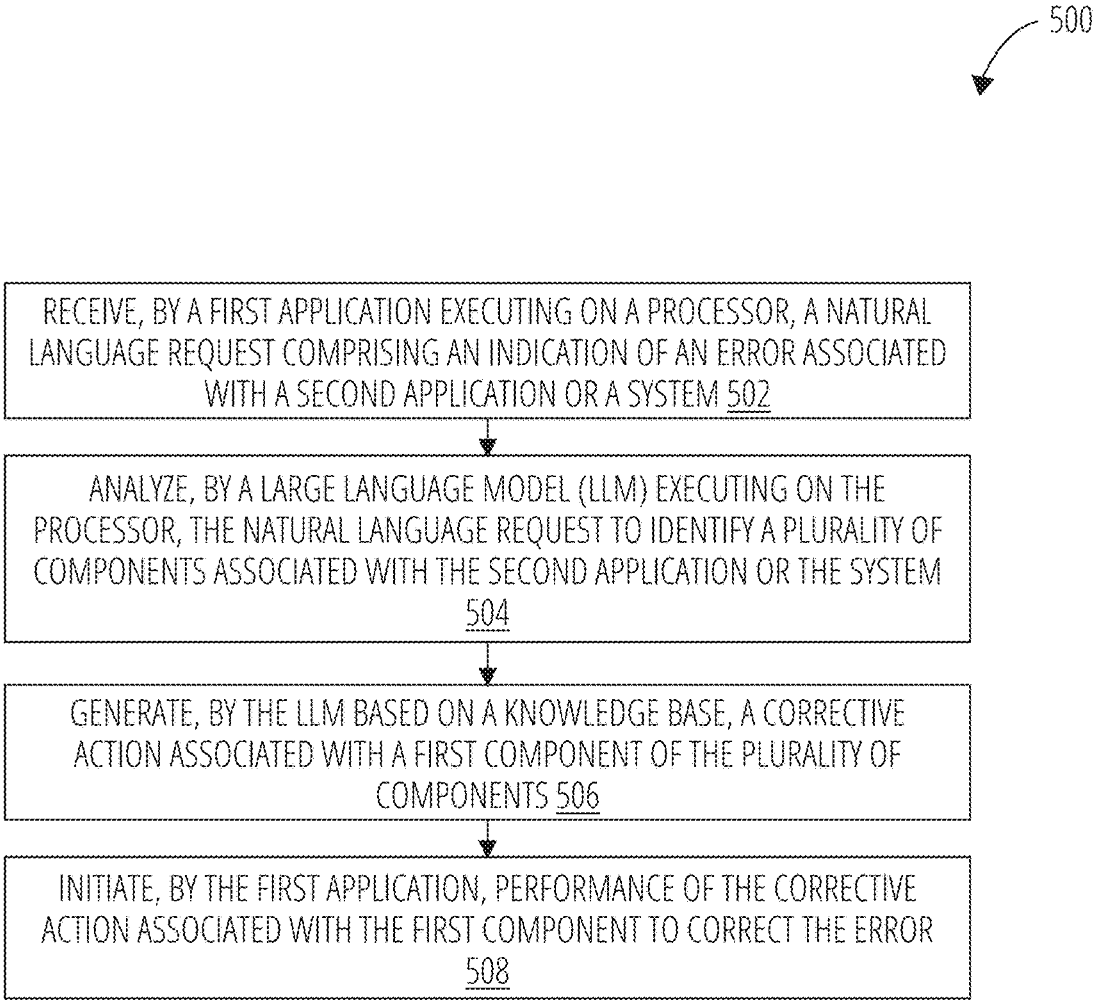

FIG. 5 illustrates a logic flow 500 in accordance with one embodiment.

Figure 6A:
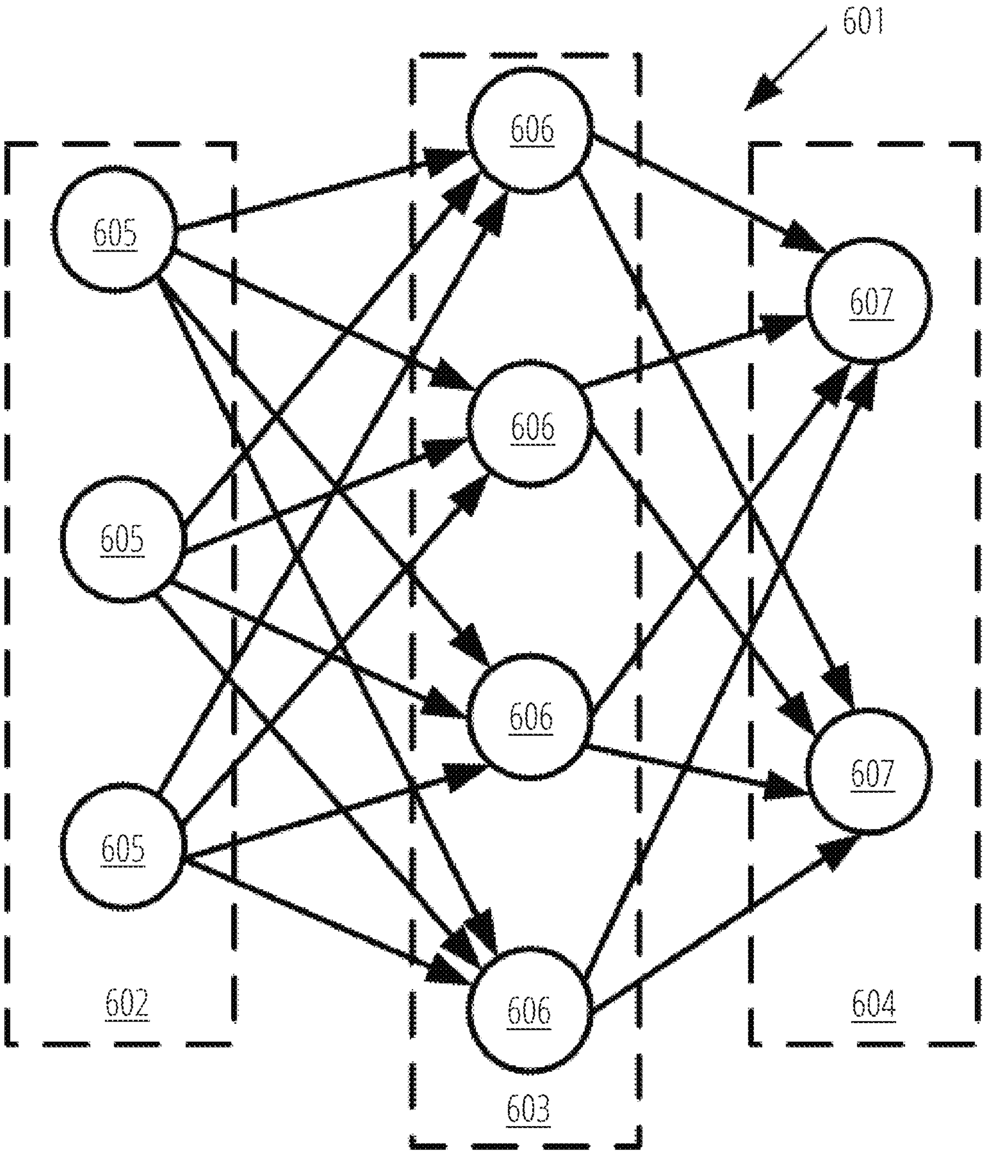

FIG. 6A is a diagram of a feedforward network, according to at least one embodiment, utilized in machine learning.

Figure 6B:
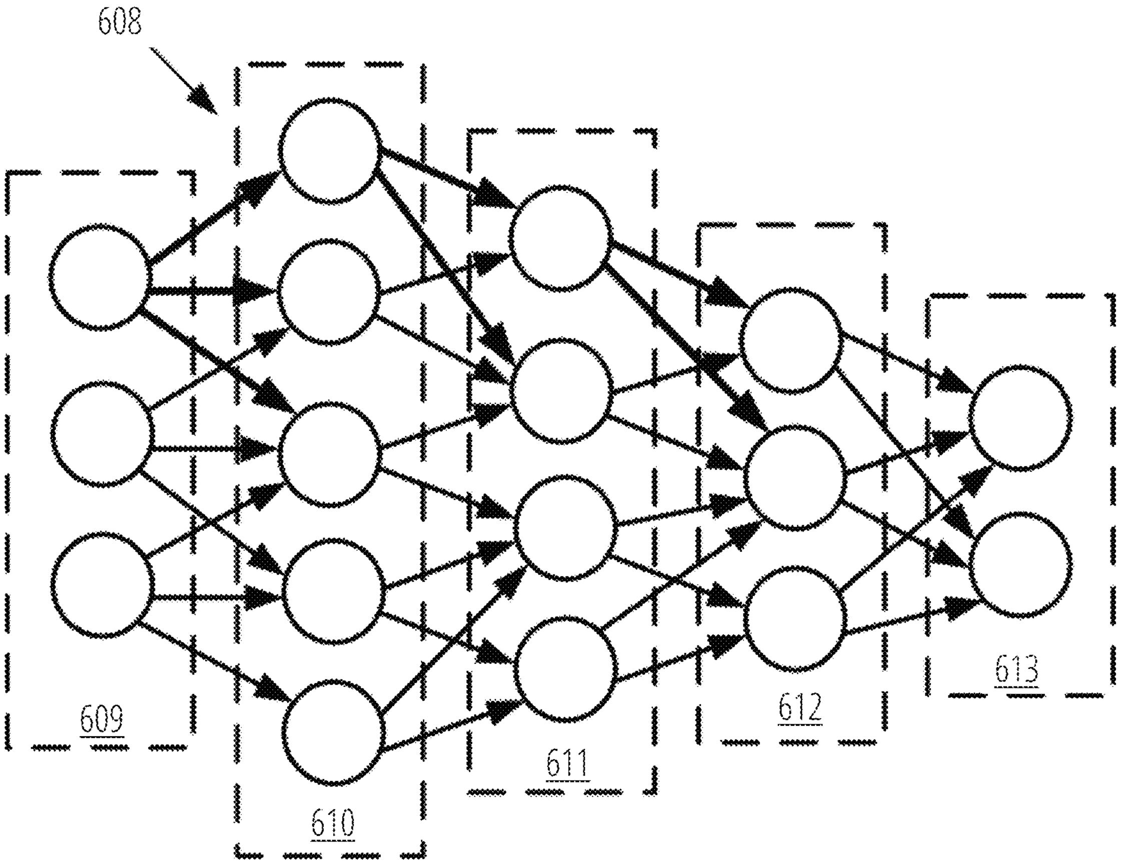

FIG. 6B is a diagram of a convolutional neural network, according to at least one embodiment, utilized in machine learning.

Figure 6C:
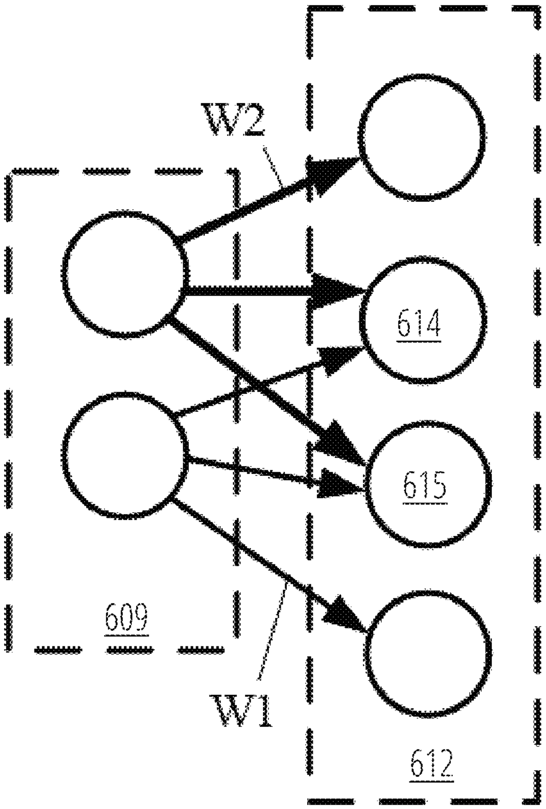

FIG. 6C is a diagram of a portion of the convolutional neural network of FIG. 6B, according to at least one embodiment, illustrating assigned weights at connections or neurons.

Figure 7:
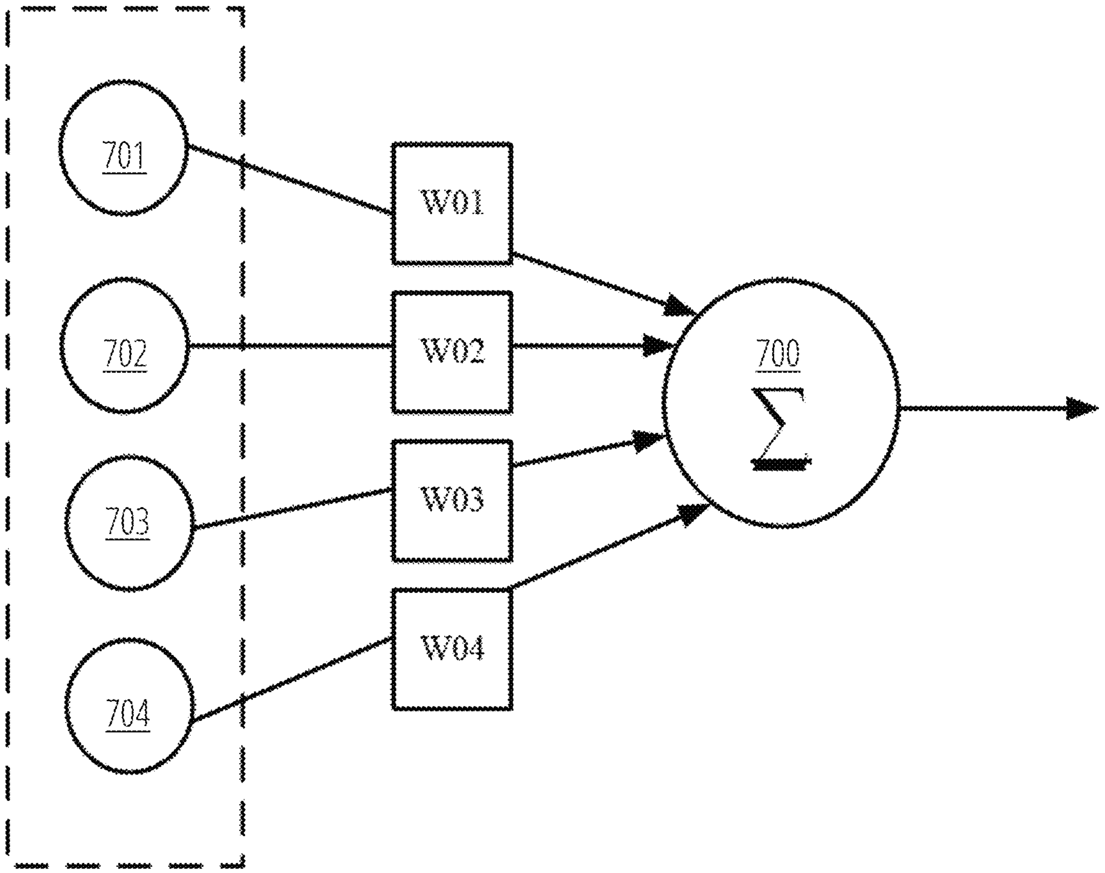

FIG. 7 is a diagram representing an exemplary weighted sum computation in a node in an artificial neural network.

Figure 8:
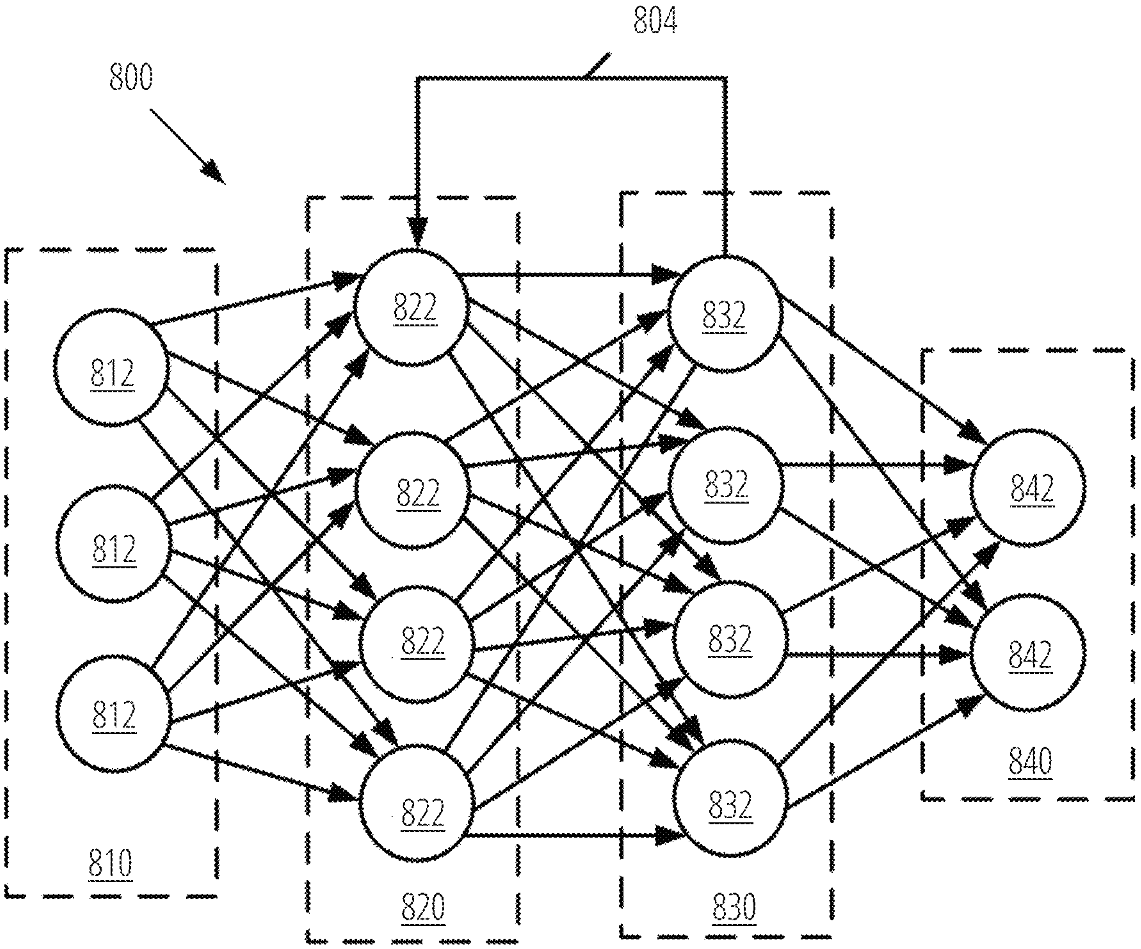

FIG. 8 is a diagram of a Recurrent Neural Network (RNN), according to at least one embodiment, utilized in machine learning.

Figure 9:
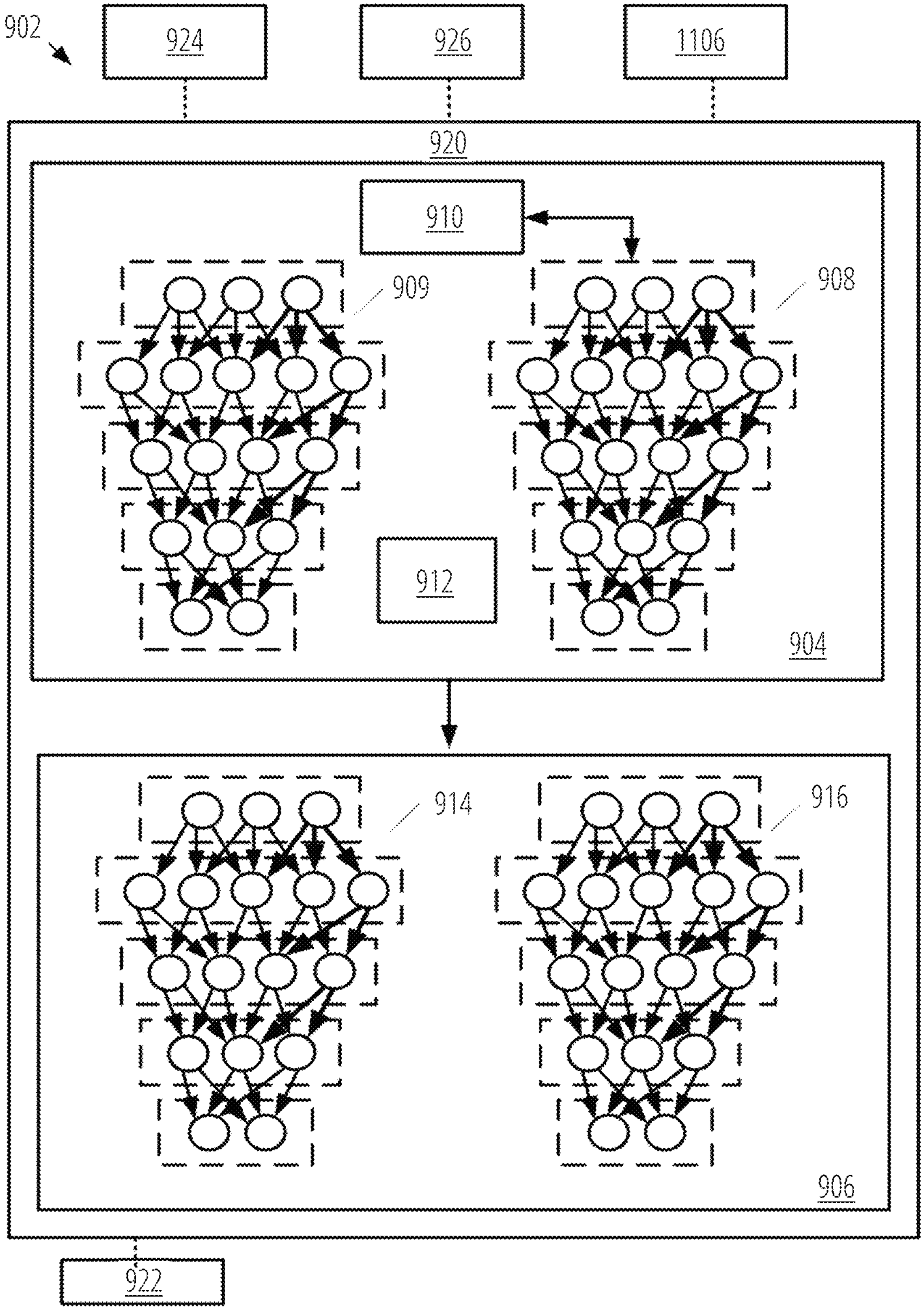

FIG. 9 is a schematic logic diagram of an artificial intelligence program including a front-end and a back-end algorithm.

Figure 10:
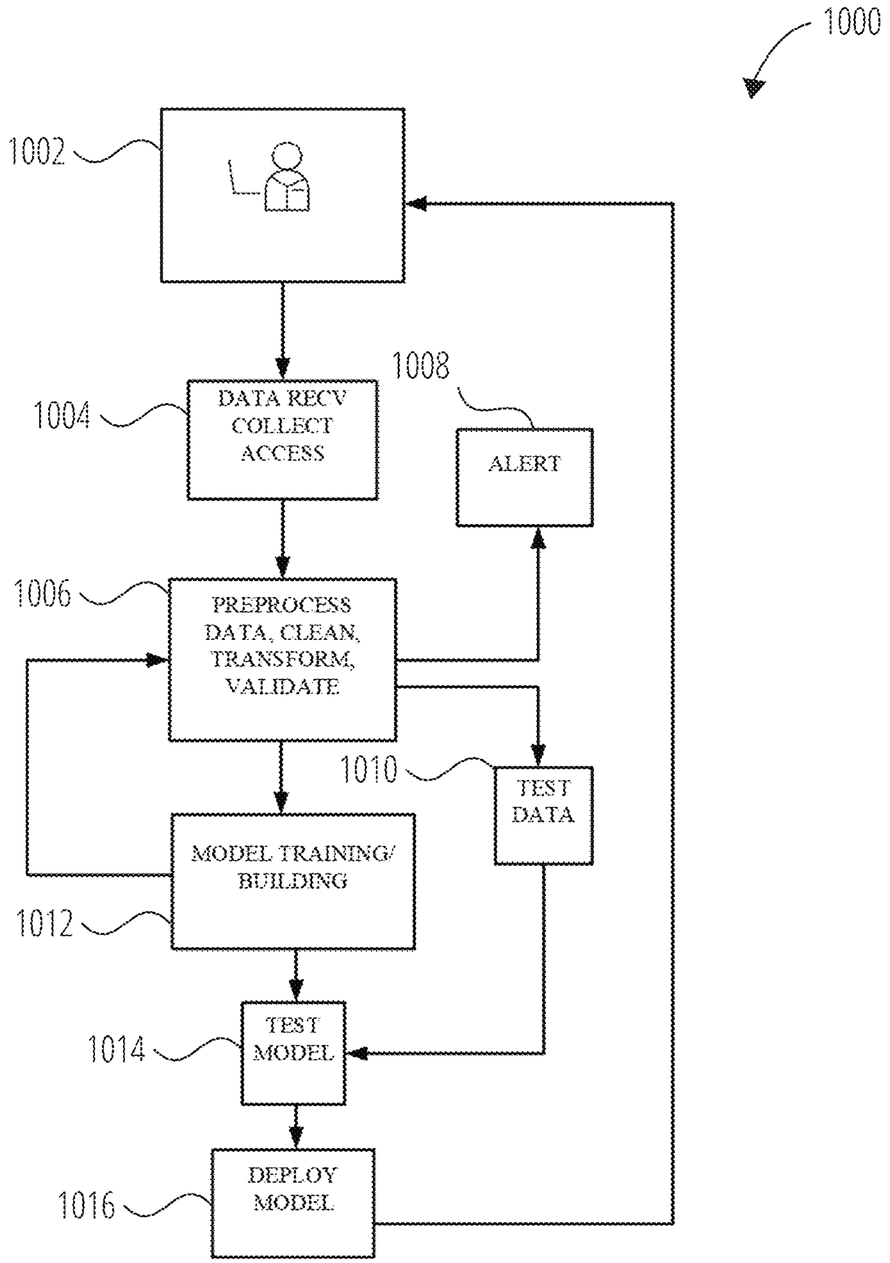

FIG. 10 is a flow chart representing a method, according to at least one embodiment, of model development and deployment by machine learning.

Figure 11:
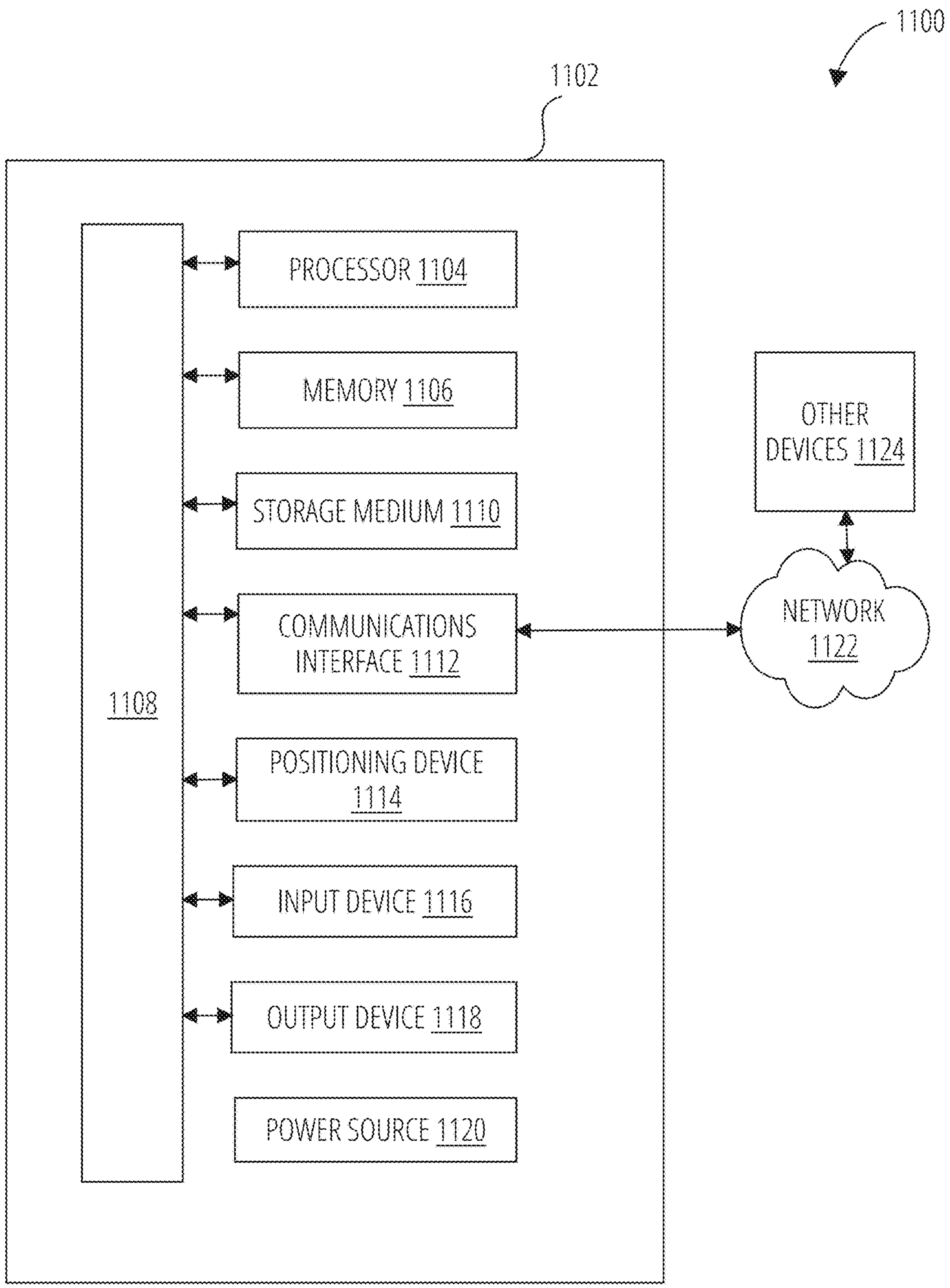

FIG. 11 illustrates a computing system 1100 for natural language triage and error correction using deep learning, in accordance with one embodiment.

DETAILED DESCRIPTION

Embodiments disclosed herein provide techniques for natural language triage and error correction using deep learning. Generally, an enterprise may provide various computing services, applications, features, etc. Embodiments disclosed herein may capture data from a variety of sources and store the data in a knowledge base. The data may include call recordings (e.g., video calls, audio calls, etc.) between employees of the enterprise, text transcripts of chats between employees of the enterprise, text transcripts of chats between employees and an LLM-based agent, error logs, documents, user profiles, runbooks, workflows, or any other type of data. One or more LLM-based agents may be trained (and periodically retrained) based on the collected data in the knowledge base. Doing so may allow the agent to converse with users in natural language, e.g., to assist users in identifying errors, correcting errors, etc. The errors may be any type of error, such as errors for applications, services, software, hardware, etc.

For example, a user may submit a natural language request to the agent. The natural language request may indicate an error or other problem, e.g., with hardware and/or software. For example, the natural language request may indicate "is our network failing?" The agent may process the request to determine one or more resources associated with the request. For example, the agent may identify network appliances, network segments, etc. The agent may then attempt to determine the state of these resources, e.g., to identify that a network appliance is down, therefore rendering a network segment inaccessible. Because the agent is trained based on the knowledge base, the agent may identify a corrective action and implement the corrective action. For example, a recording of a previous call between network administrators for a network outage may have features similar to the current state of the network. The previous call may further identify one or more corrective actions taken to correct the network outage. The agent may then implement the one or more corrective actions to correct the network outage.

More generally, agent may be trained to assist users in a variety of ways. For example, the agent may connect users to other users who are subject matter experts, users who manage or otherwise are associated with system components (e.g., applications, services, hardware, network resources, etc.), send notifications to these identified users with information regarding errors, etc. Similarly, the agent may be trained to ensure users are leveraging current information. For example, if a user is attempting to troubleshoot an error using an outdated version of a document (e.g., documentation, guides, etc.), the agent may inform the user that a newer version of the document exists. The agent may similarly provide the newer version of the document to the user and/or a summary of the changes between the outdated version of the document and the new version of the document. More generally, the trained agent may act as a dynamic decision tree that leverages enterprise-wide information to reach a decision on a corrective action and implement the corrective action to correct errors. Embodiments are not limited in these contexts.

Advantageously, embodiments disclosed herein provide a conversational AI-based triage assistant configured to identify errors in computing hardware and/or software using enterprise-wide data in a knowledge base collected across a variety of diverse platforms, such as chat transcripts, call logs, documents, user profiles, etc. By training a model based on the knowledge base, embodiments disclosed herein are able to pinpoint errors, identify relevant resources to facilitate correction of the errors (e.g., corrective actions, users, documentation, etc.), and implement corrective actions. Doing so improves the performance of systems used to detect errors relative to conventional solutions, which required manual configuration and significant levels of integration across multiple diverse systems to detect errors. Furthermore, by pinpointing errors and identifying solutions to the errors, embodiments disclosed herein may repair or otherwise restore system components to functional operating states, thereby improving the performance of these systems. Embodiments are not limited in these contexts.

Aspects of the present disclosure and certain features, advantages, and details thereof are explained more fully below with reference to the non-limiting examples illustrated in the accompanying drawings. Descriptions of well-known processing techniques, systems, components, etc. are omitted so as to not unnecessarily obscure the disclosure in detail. It should be understood that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Like numbers refer to like elements throughout.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the disclosure. Therefore, it is to be understood that, within the scope of the included claims, the disclosure may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present disclosure can include fixed function hardware, while other embodiments can utilize a software-based implementation of the functionality described. Certain embodiments combine both types of program code.

The terms “coupled,” “fixed,” “attached to,” “communicatively coupled to,” “operatively coupled to,” and the like refer to both (i) direct connecting, coupling, fixing, attaching, communicatively coupling; and (ii) indirect connecting coupling, fixing, attaching, communicatively coupling via one or more intermediate components or features, unless otherwise specified herein. “Communicatively coupled to” and “operatively coupled to” can refer to physically and/or electrically related components.

FIG. 1 illustrates a system 100 that provides natural language triage and error correction using deep learning, according to one embodiment. As shown, the system 100 includes one or more computing systems 102, one or more servers 104, one or more user devices 106, and one or more network appliances 108 communicably coupled via one or more communications networks 110. The computing systems 102, servers 104, user devices 106, and/or network appliances 108 are representative of any type of physical and/or virtualized computing system. The computing systems 102, servers 104, user devices 106, and network appliances 108 include one or more processors and one or more memory devices (each not pictured for clarity).

As shown, the servers 104, user devices 106, and network appliances 108 execute operating systems 118*a*, 118*b*, and 118*c*, respectively. The operating systems 118*a*-118*c* may be any operating system, including but not limited to Linux® operating systems, UNIX®, Windows® operating systems, macOS®, iOS®, or Android®. The computing system 102 also includes an operating system, which is not pictured for clarity.

As shown, the servers 104, user devices 106, and network appliances 108 may store, execute, or otherwise host a plurality of applications 120*a*, applications 120*b*, and applications 120*c*, respectively. The applications 120*a*-120*c* are representative of any number and type of application. For example, the applications 120*a*-120*c* may include video conferencing applications, audio conferencing applications, voice over internet protocol (VoIP) applications, soft phone applications, messaging applications, chatbots, email clients, web browsers, document editors, account management applications, mobile P2P payment system client applications, applications provided by financial institutions, financial applications, payment applications, network functions, Automated Clearing House (ACH) applications, FedNow payment applications, real-time payments (RTP) applications, monetary transfer applications, mobile wallet applications, accounting applications, payment processing frameworks, etc. Although depicted as applications, the applications 120*a*-120*c* are representative of any type of executable code, such as services, microservices, application programming interfaces (APIs), etc. Regardless of the type of a given application 120*a*-120*c*, in some embodiments, the applications 120*a*-120*c* may include features to process at least a portion of a transaction. The transactions may include purchases, payments, equity transactions, cryptocurrency sales, or any type of transaction. Furthermore, a given transaction may be processed at least in part by multiple applications 120*a*-120*c*. Further still, a given operation (including processing transactions) may include processing performed by multiple components of the system 100.

The servers 104, user devices 106, and network appliances 108 may store or otherwise provide access to data stores 122*a*, data stores 122*b*, and data stores 122*c*, respectively. The data stores 122*a*-122*c* are representative of any number and type of data storage solutions, which may include databases, files, spreadsheets, storage media, and the like. Examples of data stores 122*a*-122*c* include, but are not limited to, account databases for customer accounts, databases for payment accounts, production databases for applications, financial institution databases, databases for cached data, and databases for files such as those for user accounts, user profiles, account balances, and transaction histories, files downloaded or received from other devices, and other data items and the like. Example accounts include a checking account, a savings account, a money market account, a certificate of deposit, a mortgage or other loan account, a retirement account, a brokerage account, or any other type of account.

The network appliances 108 are representative of any type of network appliance, such as routers, switches, servers, elements of switching fabrics, etc. Although depicted as external to the network 110, the network appliances 108 may be part of the network 110.

As shown, the computing system 102 includes a triage application 112*a* and the user devices 106 include a corresponding triage application 112*b*. The triage application 112*a* may be the same as triage application 112*b*. For example, the triage application 112*b* may be a client-side instance of the application, while the triage application 112*a* may be a server-side instance of the application.

The computing system 102 further includes one or more triage chat models 114 and one or more knowledge bases 116. In some embodiments, the triage chat model 114 is a component of the triage application 112*a* and/or triage application 112*b*. The knowledge base 116 is a centralized repository of information available in the system 100. In some embodiments, the triage application 112*a* collects and/or receives the data stored in the knowledge base 116. For example, the triage application 112*a* may periodically poll the applications 120*a*-120*c*, servers 104, operating systems, network 110, and/or network appliances 108 and receive data to be processed and/or stored in the knowledge base 116. Similarly, the applications 120*a*-120*c*, servers 104, operating systems, network 110, and/or network appliances 108 may transmit data to the triage application 112*a* for storage in the knowledge base 116. Similarly, users may save data to the knowledge base 116. The knowledge base 116 may be implemented in any suitable data structure, such as databases, knowledge graphs, files, etc.

For example, as shown, the knowledge base 116 includes one or more data stores for transcripts 124, recordings 126, documents 128, user profiles 130, system logs 132, and other data 134. The transcripts 124 include text transcripts of communications between users, e.g., in messaging applications, video and/or audio conferencing applications, emails, etc. In some embodiments, the transcripts 124 include transcripts generated based on speech-to-text algorithms applied to recorded audio and/or video conferencing sessions stored in the recordings 126. Furthermore, the transcripts 124 may include transcripts of communications between one or more users and the triage chat model 114. The recordings 126 include recorded audio and/or video calls (or conferences) between two or more users (e.g., using the applications 120*a*-120*c*). The recordings 126 further include recorded audio and/or video calls between one or more users and an instance of the triage chat model 114 that communicates using speech. The documents 128 stores a plurality of different types of documents for an enterprise (e.g., a business, organization, educational institution, government body, etc., such as emails, manuals, guides, workflow templates, runbooks (e.g., operations to correct errors), documentation, etc. The logs 132 store performance logs, transaction logs, error logs, and/or other types of logs generated by the components of the system 100. For example, the servers 104 may generate error logs for the applications 120*a*, performance logs, etc. In examples where the applications 120*a*-120*c* process payments, data describing the transactions (e.g., amount, parties, transaction status, etc.) may be stored in the logs 132. The data 134 stores any other type of data in the system 100, such as source code of the applications 120*a*-120*c*, account information, etc.

The triage chat model 114 is an artificial intelligence (AI) model that provides natural language triage and error correction using deep learning the system 100. For example, the triage chat model 114 may communicate with users via natural language text and/or speech to assist users with error triage and error correction, e.g., based at least in part on the knowledge base 116. The triage chat model 114 may be any type of AI model, such as a large language model (LLM), neural network, machine learning model, etc. The triage chat model 114 may be trained using training data. Examples of training data that may be used to train the triage chat model 114 include the knowledge base 116. For example, the triage chat model 114 may be trained to learn features of the transcripts 124, recordings 126, documents 128, profiles 130, logs 132, and/or data 134 of the knowledge base 116. Such features may include indications of errors in the system 100, components of the system 100 associated with errors, corrective actions performed to correct the errors, users associated with correcting the errors, data associated with the errors (e.g., recordings 126, transcripts 124, documents 128, etc.), and the like. By learning such features, or requirements, the triage chat model 114 may be trained to communicate with users for any need, such as determining system status (e.g., of hardware and/or software in the system 100), identifying errors, identifying attributes of errors, identifying components associated with errors, identifying users who can assist in correcting errors, identifying and initiating corrective actions to correct errors, identifying documentation or other data that can be used as resources in error correction, etc. Embodiments are not limited in these contexts.

Training the triage chat model 114 may include annotating the training data, e.g., adding metadata describing the components of the system 100, e.g., annotating transcripts 124 and/or recordings 126 with indications of participants, topics discussed, system errors, etc., annotating documents 128 with associated users, components of the system 100, and errors, annotating the user profiles 130 with indications of subject matter expertise for different users, annotating the logs 132 with indications of system state, errors, diagnostic tests, corrective actions, etc. Training the triage chat model 114 may further include preprocessing the training data. For example, the training data may be structured and cleaned to ensure consistency (e.g., removing noise, handling missing values, removing non-compliant code, etc.). The training data may further be tokenized.

The preprocessed and annotated training dataset is then used to train the triage chat model 114. During this process, the triage chat model 114 is provided with input features derived from the training data and sample natural language input. The training may include emphasizing error detection and correction by reinforcing correct natural language outputs and penalizing erroneous outputs. The training may further include evaluation and validation.

The trained triage chat model 114 may then be used to communicate with users associated with the system 100. For example, a user of the triage application **112*b* may provide a natural language request as input. For example, the natural language request may specify "are mobile payments down?" The triage application 112*b* may transmit an indication of the request to the triage application 112*a*. The triage application 112*a* may provide the indication of the request to the triage chat model 114. The triage chat model 114 may then tokenize the input (e.g., the natural language request) and use its embeddings to understand the meaning and intent behind the natural language request. For example, based on the embeddings, the triage chat model 114 may determine a function associated with the request (e.g., an mobile payment application 120*a* and any other components of the system 100 associated with processing mobile payments). The triage chat model 114 recognizes concepts, functions, errors, corrective actions, supporting documentation, and associated user based on the training. Doing so allows the triage chat model 114** to recognize intent (e.g., that the user wants to know why a mobile payment is not being processed) and/or context.

The triage chat model 114 may then confirm the existence of an error based on the request. For example, the triage chat model 114 may generate instructions for diagnostic tests to test system performance learned during training. For example, the triage chat model 114 may generate instructions to communicate with the application **120*a* providing the mobile payment feature, e.g., to ping the associated server 104 and/or network appliances 108, test the network 110, send a status request to the application 120*a* (and wait for an acknowledgement and/or response), etc. The triage application 112*a* may then cause the instructions to be executed to verify the existence of an error. As another example, the instructions may cause the triage application 112*a* to identify an error associated with the mobile payment application 120*a* (and/or the servers 104, network appliances 108, and/or network 110) in the logs 132**.

The triage application **112*a* may then provide any collected and/or received data based on executing the diagnostic tests to the triage chat model 114 for further processing. For example, based on a lack of a response from a network appliance 108-1, the triage chat model 114 may determine that the network appliance 108-1 is causing the mobile payment application 120*a* to experience errors. As another example, based on the lack of a response from the mobile payment application 120*a*, the triage chat model 114 may determine that the mobile payment application 120*a* has crashed. As another example, the triage application 112*a* may provide the source code of the mobile payment application 120*a* to the triage chat model 114**, which may identify one or more errors in the source code.

Based on the detected error(s), the triage chat model 114 may then determine and initiate one or more corrective actions. For example, the triage chat model 114 may correct the error in the source code of the mobile payment application **120*a*, restart the network appliance 108-1, restart a server 104, restart the mobile payment application 120*a*, etc. In some embodiments, the triage chat model 114 may output an indication of the corrective action to a user for approval via the triage application 112*a* or triage application 112*b*. In such embodiments, the user may be determined based on the training, which allows the triage chat model 114 to identify one or more users associated with the mobile payment application. If the users approve the corrective action, the triage application 112*a* or triage application 112*b*** may initiate performance of the corrective action. However, in some embodiments, the corrective action may be automatically initiated without requiring user input.

Therefore, for example, the triage application **112*a* may initiate deployment of the source code generated by the triage chat model 114, restart the network appliance 108-1, restart the mobile payment application 120*a*, restart a server 104**, restart an operating system, modify any parameter thereof, etc.

More generally, the triage chat model 114 may further provide conversational triage based on the knowledge base 116 to a user. For example, the triage chat model 114 may determine that a user is working with an old version of a technical support document in the documents 128. The triage chat model 114 may identify a newer version of the technical support document in the documents 128 and provide a selectable link that allows the user to download or otherwise access the newer version of the document. In some embodiments, the triage chat model 114 may compare the different versions of the document and generate a textual summary of the differences between the documents. The summary may be outputted to the user to allow the user to view the differences. Embodiments are not limited in these contexts.

As another example, the triage chat model 114 may identify one or more users that are associated with the detected error. For example, the triage chat model 114 may identify developers of the mobile payment application **120*a*, product managers of the mobile payment application 120*a*, etc. In some embodiments, the triage application 112*a* may initiate a call with the requesting user and the identifies users, e.g., using a video conferencing application 120*a*-120*c***.

As yet another example, the triage chat model 114 may identify transcripts 124 and/or recordings 126 that have features that are similar to the input question. For example, the triage chat model 114 may determine that the mobile deposit error occurred on the same date in the previous month. As another example, the triage chat model 114 may determine that a similar error occurred to a different application 120*a*. The triage chat model 114 may then use any corrective actions applied to fix these errors to fix the mobile deposit application 120*a* error.

In some embodiments, a user may ask for other types of assistance. For example, the user may ask "who is responsible for the mobile deposit application?" The triage chat model 114 may then identify one or more users, e.g., based on the profiles 130, that are associated with the requested application and provide their contact information to the requesting user. As another example, the user may ask "where is the documentation for the payment server?" In response, the triage chat model 114 may identify one or more documents in the documents 128, and return the documents to the user (and/or links thereto). Embodiments are not limited in these contexts.

Advantageously, the triage chat model 114 may act as a dynamic decision tree that leverages the information in the knowledge base 116 to reach a decision on a corrective action and implement the corrective action to correct errors. Embodiments are not limited in these contexts. Doing so allows the enterprise associated with the system 100 to automate error detection and correction such that the triage chat model 114 detects and corrects errors. Doing so improves the functioning of the system 100 by ensuring uptime and availability of the components of the system 100. Furthermore, doing so reduces the amount of time and resources to identify and correct errors in the system 100. Embodiments are not limited in these contexts.

In one embodiment, when a user decides to enroll in a mobile banking program, the user downloads or otherwise obtains the mobile banking system client application from a mobile banking system, for example enterprise system 100, or from a distinct application server. In other embodiments, the user interacts with a mobile banking system via a web browser application in addition to, or instead of, the mobile P2P payment system client application.

The network 110 may also incorporate various cloud-based deployment models including private cloud (e.g., an organization-based cloud managed by either the organization or third parties and hosted on-premises or off premises), public cloud (e.g., cloud-based infrastructure available to the general public that is owned by an organization that sells cloud services), community cloud (e.g., cloud-based infrastructure shared by several organizations and manages by the organizations or third parties and hosted on-premises or off premises), and/or hybrid cloud (e.g., composed of two or more clouds e.g., private community, and/or public).

The user devices 106 may include automatic teller machines (ATMs) utilized by the system 100 in serving users. In another example, the servers 104 represent payment clearinghouse or payment rail systems for processing payment transactions, and in another example, the servers 104 such as merchant systems or banking systems configured to interact with the user devices 106 during transactions and also configured to interact with the enterprise system 100 in back-end transactions clearing processes.

System 100 as illustrated diagrammatically represents at least one example of a possible implementation, where alternatives, additions, and modifications are possible for performing some or all of the described methods, operations, and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The system 100 can offer any number or type of services and products to one or more users. In some examples, an enterprise system 100 offers products. In some examples, an enterprise system 100 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 100, automated assistance may be provided by the enterprise system 100. For example, automated access to user accounts and replies to inquiries may be provided by enterprise-side automated voice, text, and graphical display communications and interactions. In at least some examples, any number of human agents, can be employed, utilized, authorized, or referred by the enterprise system 100. Such human agents can be, as non-limiting examples, point of sale or point of service (POS) representatives, online customer service assistants available to users, advisors, managers, sales team members, and referral agents ready to route user requests and communications to preferred or particular other agents, human or virtual.

Human agents may utilize agent devices (e.g., user devices 106) to serve users in their interactions to communicate and take action. In such embodiments, the user devices 106 can be, as non-limiting examples, computing devices, kiosks, terminals, smart devices such as phones, and devices and tools at customer service counters and windows at POS locations.

FIG. 2 illustrates an example logic flow 200 for natural language triage and error correction using deep learning. Although the example logic flow 200 depicts a particular sequence of operations, the sequence may be altered without departing from the scope of the present disclosure. For example, some of the operations depicted may be performed in parallel or in a different sequence that does not materially affect the function of the logic flow 200. In other examples, different components of an example device or system that implements the logic flow 200 may perform functions at substantially the same time or in a specific sequence.

According to some examples, the logic flow 200 includes collecting data at block 202. For example, the triage application 112*a* illustrated in FIG. 1 may collect data from various components in the system 100 and store the data in the knowledge base 116. In some embodiments, the triage application 112*a* may process the data before storing the same in the knowledge base, e.g., to run natural language processing algorithms, speech-to-text algorithms, etc.

According to some examples, the logic flow 200 includes training a model such as the triage chat model 114 at block 204. For example, the triage chat model 114 may be trained as described in greater detail with reference to FIG. 1 and/or FIG. 6A-FIG. 10.

According to some examples, the logic flow 200 includes receiving a natural language request at block 206. For example, the triage application 112*a* illustrated in FIG. 1 may receive natural language request from a user. The request may be "is the network down?"

According to some examples, the method includes detecting an error at block 208. For example, the computing systems 102 illustrated in FIG. 1 may detect an error based on the natural language request. For example, the triage chat model 114 may determine that a network appliance 108-1 is offline and needs to be restarted.

According to some examples, the logic flow 200 includes identifying and implementing one or more corrective actions at block 210. For example, the triage chat model 114 may restart the network appliance 108-1. Although not depicted, blocks 206-210 may include additional natural language conversation between the triage chat model 114 and the user. Embodiments are not limited in these contexts.

In some embodiments, the logic flow 200 includes returning to block 202, e.g., to collect and store additional data in the knowledge base 116 and retrain the triage chat model 114 based on the additional data. Doing so trains the triage chat model 114 to identify and correct errors more accurately and with fewer attempts. In some embodiments, the triage chat model 114 is re-trained at periodic time intervals. In some embodiments, rather than retraining the triage chat model 114, the logic flow 200 skips retraining at block 204 and proceeds to block 206 to receive and process new natural language requests. Embodiments are not limited in these contexts.

FIG. 3A illustrates an example graphical user interface 302 of the triage application 112*a*, according to one embodiment. Although discussed with reference to the triage application 112*a*, the triage application 112*b* may provide the same or similar functionality discussed with reference to FIG. 3A-FIG. 3B. Embodiments are not limited in these contexts.

As shown, the graphical user interface 302 includes a chat interface 304 to receive natural language input from a user. In the example depicted in FIG. 3A, the user asks "is mobile deposit working?" The user may submit the request via the selectable element 306. As stated, indications of the text in the chat interface 304 may be provided by the triage application 112*a* to the triage chat model 114, such that the triage chat model 114 may converse with the user.

FIG. 3B illustrates an embodiment where the user submitted the request depicted in FIG. 3A using the selectable element 306. As shown, the chat interface 304 is updated to include a conversation between the user and the triage chat model 114. As shown, the triage chat model 114 communicates, to the user, that the mobile deposit feature is not working. The triage chat model 114 further indicates that another user had a similar problem in the past and the solution was to restart a server such as server 104. The triage chat model 114 asks the user if they would like to restart the server. Based on the user approving the restart, the triage chat model 114 may generate instructions to restart the server 104. The triage application 112*a* may then execute the instructions to restart the server 104.

FIG. 4A illustrates an example graphical user interface 402 of the triage application 112*a*, according to one embodiment. Although discussed with reference to the triage application 112*a*, the triage application 112*b* may provide the same or similar functionality discussed with reference to FIG. 4A-FIG. 4C. Embodiments are not limited in these contexts.

As shown, the graphical user interface 402 includes a chat interface 404 to receive natural language input from a user. In the example depicted in FIG. 4A, the user indicates that a transaction has not been processed and that a document stored at a location (represented by "<filepath>") in the documents 128 is not providing the solution. The user may submit the request via the selectable element 406 As stated, indications of the text in the chat interface 304 may be provided by the triage application 112*a* to the triage chat model 114, such that the triage chat model 114 may converse with the user.

FIG. 4B illustrates an embodiment where the user submitted the request depicted in FIG. 4A using the selectable element 406. As shown, the graphical user interface 402 is updated to include a conversation between the user and the triage chat model 114. As shown, the triage chat model 114 indicates, to the user, that they are not working with the most current version of the troubleshooting guide. Advantageously, however, the triage chat model 114 generates a summary 408 that includes differences between the versions of the troubleshooting guide. The user then asks for more information, and the triage chat model 114 indicates that an example user Y had a similar problem, e.g., based on the transcripts 124.

FIG. 4C is a continuation of the conversation of FIG. 4B. As shown, the triage chat model 114 has generated a summary 408 of the transcript 124 between the triage chat model 114 and user Y when user Y had the same problem with transaction posting. Furthermore, the triage chat model 114 indicates that, based on an analysis of the source code of the associated application (e.g., one or more of applications 120*a*-120*c*), that a memory leak needs to be corrected in the source code, and that a notification has been sent to the responsible developers.

The triage chat model 114 further outputs a selectable element 412 that allows the user to initiate a call with the developers. For example, when selected, the selectable element 412 may launch a video conferencing application and initiate a call between the user and the developers. Doing so allows the right team members to be gathered to discuss and correct the error. Embodiments are not limited in these contexts.

FIG. 5 illustrates an example logic flow 500 for natural language triage and error correction using deep learning. Although the example logic flow 500 depicts a particular sequence of operations, the sequence may be altered without departing from the scope of the present disclosure. For example, some of the operations depicted may be performed in parallel or in a different sequence that does not materially affect the function of the logic flow 500. In other examples, different components of an example device or system that implements the logic flow 500 may perform functions at substantially the same time or in a specific sequence.

According to some examples, the logic flow 500 includes receiving, by a first application executing on a processor, a natural language request comprising an indication of an error associated with a second application or a system at block 502. For example, the triage application 112*a* illustrated in FIG. 1 may receive a natural language request comprising an indication of an error associated with a second application such as applications 120*a*-120*c* or a system such as one of the servers 104.

According to some examples, the logic flow 500 includes analyzing, by a large language model (LLM) executing on the processor, the natural language request to identify a plurality of components associated with the second application or the system at block 504. For example, the triage chat model 114 illustrated in FIG. 1 may analyze the natural language request to identify a plurality of components associated with the second application or the system. For example, the triage chat model 114 may identify an application 120*a*-120*c*, a server 104, a network 110, a network appliance 108, etc.

According to some examples, the logic flow 500 includes generating, by the LLM based on a knowledge base, a corrective action associated with a first component of the plurality of components at block 506. For example, the triage chat model 114 illustrated in FIG. 1 may generate, based on the knowledge base 116, a corrective action associated with a first component of the plurality of components. For example, the triage chat model 114 may generate instructions to restart an application 120*a*-120*c*, operating system 118*a*-118*c*, restart servers 104, restart network appliances 108, and/or modify any parameters thereof.

According to some examples, the logic flow 500 includes initiating, by the first application, performance of the corrective action associated with the first component to correct the error at block 508. For example, the triage application 112*a* illustrated in FIG. 1 may initiate performance of the corrective action generated at block 506 to correct the error. Embodiments are not limited in these contexts.

As used herein, an artificial intelligence system, artificial intelligence algorithm, artificial intelligence module, program, and the like, generally refer to computer implemented programs that are suitable to simulate intelligent behavior (e.g., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 601 referenced in FIG. 6A) may include a topography with a hidden layer 603 between an input layer 602 and an output layer 604. The input layer 602, having nodes commonly referenced in FIG. 6A as input nodes 605 for convenience, communicates input data, variables, matrices, or the like to the hidden layer 603, having nodes 606. The hidden layer 603 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 605 of the input layer, which then communicates the data to the hidden layer 603. The hidden layer 603 may be configured to determine the state of the nodes in the respective layers and assign weight coefficients or parameters of the nodes based on the edges separating each of the layers, e.g., an activation function implemented between the input data communicated from the input layer 602 and the output data communicated to the nodes 607 of the output layer 604. It should be appreciated that the form of the output from the neural network may generally depend on the type of model represented by the algorithm. Although the feedforward network 601 of FIG. 6A expressly includes a single hidden layer 603, other embodiments of feedforward networks within the scope of the descriptions can include any number of hidden layers. The hidden layers are intermediate the input and output layers and are generally where all or most of the computation is done. In some embodiments, the triage chat model 114 includes one or more of the feedforward networks 601.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 608 in FIG. 6B. As in the feedforward network 601 of FIG. 6A, the illustrated example of FIG. 6B has an input layer 609 and an output layer 613. However where a single hidden layer 603 is represented in FIG. 6A, multiple consecutive hidden layers 610, 611, and 612 are represented in FIG. 6B. The edge neurons represented by white-filled arrows highlight that hidden layer nodes can be connected locally, such that not all nodes of succeeding layers are connected by neurons. In some embodiments, the triage chat model 114 includes one or more of the CNNs 608.

FIG. 6C, representing a portion of the convolutional neural network 608 of FIG. 6B, specifically portions of the input layer 609 and the first hidden layer 610, illustrates that connections can be weighted. In the illustrated example, labels W1 and W2 refer to respective assigned weights for the referenced connections. Two hidden nodes 614 and 615 share the same set of weights W1 and W2 when connecting to two local patches.

Weight defines the impact a node in any given layer has on computations by a connected node in the next layer. FIG. 7 represents a particular node 700 in a hidden layer. The node 700 is connected to several nodes in the previous layer representing inputs to the node 700. The input nodes 701, 702, 703 and 704 are each assigned a respective weight W01, W02, W03, and W04 in the computation at the node 700, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current computation of the parameter, e.g., at least a portion of the output data from the RNN may be used as feedback/input in computing subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network (RNN) is referenced as 800 in FIG. 8. In some embodiments, the triage chat model 114 includes one or more of the RNNs 800. As in the feedforward network 601 of FIG. 6A, the illustrated example of FIG. 8 has an input layer 810 (with nodes 812) and an output layer 840 (with nodes 842). However, where a single hidden layer 603 is represented in FIG. 6A, multiple consecutive hidden layers 820 and 830 are represented in FIG. 8 (with nodes 822 and nodes 832, respectively). As shown, the RNN 800 includes a feedback connector 804 configured to communicate parameter data from at least one node 832 from the second hidden layer 830 to at least one node 822 of the first hidden layer 820. It should be appreciated that two or more and up to all of the nodes of a subsequent layer may provide or communicate a parameter or other data to a previous layer of the RNN 800. Moreover and in some embodiments, the RNN 800 may include multiple feedback connectors 804 (e.g., connectors 804 suitable to communicatively couple pairs of nodes and/or feedback connectors 804 configured to provide communication between three or more nodes). Additionally or alternatively, the feedback connector 804 may communicatively couple two or more nodes having at least one hidden layer between them, e.g., nodes of nonsequential layers of the RNN 800.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 9 and some embodiments, an artificial intelligence (AI) program 902 may include a front-end algorithm 904 and a back-end algorithm 906. The artificial intelligence program 902 may be implemented on an AI processor 920, such as the processor 1104 of computer 1102 of FIG. 11, and/or a dedicated processing device (e.g., computing system 102, servers 104, user devices 106, etc.). In some embodiments, the triage chat model 114 is embodied as the artificial intelligence program 902. The instructions associated with the front-end algorithm 904 and the back-end algorithm 906 may be stored in an associated memory device and/or storage device of the system (e.g., memory 924 and/or storage 926 in FIG. 9), etc.) communicatively coupled to the AI processor 920, as shown. Additionally or alternatively, one or more memory devices and/or storage devices (e.g., storage medium 1110 and/or memory 1106 of FIG. 11, etc.) may be used for processing use and/or including one or more instructions necessary for operation of the AI program 902. In some embodiments, the AI program 902 may include a deep neural network (e.g., a front-end algorithm 904 configured to perform pre-processing, such as feature recognition, and a back-end algorithm 906 configured to perform an operation on the data set communicated directly or indirectly to the back-end algorithm 906). For instance, the front-end algorithm 904 can include at least one CNN 908 communicatively coupled to send output data to the back-end algorithm 906.

Additionally or alternatively, the front-end algorithm 904 can include one or more AI algorithms 910, 912 (e.g., statistical models or machine learning programs such as decision tree learning, associate rule learning, recurrent artificial neural networks, support vector machines, and the like). In various embodiments, the front-end algorithm 904 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 908 and/or AI algorithm 910 may be used for image recognition, input categorization, and/or support vector training. In some embodiments and within the front-end algorithm 904, an output from an AI algorithm 910 may be communicated to a CNN 908 or 909, which processes the data before communicating an output from the CNN 908, 909 and/or the front-end algorithm 904 to the back-end algorithm 906. In various embodiments, the back-end algorithm 906 may be configured to implement input and/or model classification, speech recognition, translation, and the like. For instance, the back-end algorithm 906 may include one or more CNNs (e.g., CNN 914) or dense networks (e.g., dense networks 916), as described herein.

For instance, and in some embodiments of the AI program 902, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end algorithm 904). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 902 may be trained using a semi-supervised learning process in which some but not all of the output data is known, e.g., a mix of labeled and unlabeled data having the same distribution.

In some embodiments, the AI program 902 may be accelerated via a machine learning framework 922 (e.g., hardware). The machine learning framework may include an index of operations, subroutines, and the like (primitives) typically implemented by AI and/or machine learning algorithms. Thus, the AI program 902 may be configured to utilize the primitives of the framework 922 to perform some or all of the computations required by the AI program 902. Primitives suitable for inclusion in the machine learning framework 922 include operations associated with training a convolutional neural network (e.g., pools), tensor convolutions, activation functions, algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 10 is a flow chart representing a logic flow 1000, according to at least one embodiment, of model development and deployment by machine learning. The logic flow 1000 represents at least one example of a machine learning workflow in which operations are implemented in a machine-learning project. For example, the logic flow 1000 may be a workflow to train the triage chat model 114.

In block 1002, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, block 1002 can represent a starting point. However, with regard to continuing or improving an ongoing machine learning workflow, block 1002 can represent an opportunity for further user input or oversight via a feedback loop. Such feedback may flow through a user, or in various embodiments, the method automatically provides feedback, retrains and redeploys the retrained model.

In block 1004, data is received, collected, accessed, or otherwise acquired and entered as can be termed data ingestion. The data may include the data in the knowledge base 116. In block 1006, the data ingested in block 1004 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing block 1006 is updated with newly ingested data, an updated model will be generated. Block 1006 can include data validation, which focuses on confirming that the statistics of the ingested data are as expected, such as that data values are within expected numerical ranges, that data sets are within any expected or required categories, and that data comply with any needed distributions such as within those categories. Block 1006 can proceed to block 1008 to automatically alert the initiating user, other human or virtual agents, and/or other systems, if any anomalies are detected in the data, thereby pausing or terminating the process flow until corrective action is taken.

In block 1010, training test data such as a target variable value is inserted into an iterative training and testing loop. In block 1012, model training, a core step of the machine learning workflow, is implemented. A model architecture is trained in the iterative training and testing loop. For example, features in the training test data are used to train the model based on weights and iterative computations in which the target variable may be incorrectly predicted in an early iteration as determined by comparison in block 1014, where the model is tested. Subsequent iterations of the model training, in block 1012, may be conducted with updated weights in the computations.

During each iteration of the training and testing loop, the accuracy of the model may be evaluated. In one embodiment, the re-evaluation of the model can include comparing an output of the model with an actual target result or variable to determine the accuracy of the prediction. If the model is not satisfying a minimum threshold level of accuracy (e.g., the model is underfitted), the system may automatically determine that the threshold level of accuracy is not satisfied and may adjust the weights for a subsequent iteration of the training and testing loop. The weights may be iteratively adjusted during each iteration of the training and testing loop based on the comparison to the threshold level of accuracy. However, there is a balance for training the model to avoid overfitting when the model would not perform well on predictions of new data. Rather, the model is automatically trained to be well-fitted such that it satisfies a threshold level of accuracy without learning the noise in the data to the extent that the model would not apply to new data by preventing additional iterations of the training and testing once a maximum accuracy threshold value has been obtained. Thus, with each iteration of the training and testing loop, the accuracy of the model is improved and the iterative training and testing of the model provides an improvement to the performance of a computer and computing technology because the system may automatically determine how many iterations to perform so that the model is well-fitted by surpassing the minimum threshold level of accuracy while automatically stopping the iterative training and testing of the model before the maximum accuracy threshold is obtained. In some embodiments, the training and testing loop utilizes a backpropagation algorithm and a gradient descent algorithm. Gradient descent is an optimization algorithm used to minimize differentiable real-valued multivariate functions. Gradient descent is an optimization algorithm used to minimize differentiable real-valued multivariate functions. The gradient descent algorithm may be used to iteratively adjust model parameters using computed derivatives to minimize a loss function. Backpropagation may be used to compute the gradient of the error function with respect to the neural network's weights.

When compliance and/or success in the model testing in block 1014 is achieved, process flow proceeds to block 1016, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

As discussed above, oversight of a deployed machine learning model may be automatically performed via a feedback loop whereby the method assesses performance of the deployed model (see block 1016) and the feedback loop automatically provides feedback for further training of the machine learning model to improve its performance, and upon completion of the other method blocks such as block 1012, the machine learning model that has been automatically retrained based on the feedback loop is then redeployed (block 1014). In some embodiments, the system is continually receiving training data as new predictions are made and more data is collected. The continuous training data may be discretized to generate input data to retrain the model. Discretization methods can convert continuous data to discrete data by binning, clustering, and numerical discretization. The model may monitor incoming data sets to make predictions. When predictions are made the system analyzes the predictions to determine whether the model needs to be retrained.

In some embodiments, the model (e.g., the triage chat model 114) may detect anomalies in the predictions. Anomaly detection can provide a benefit by identifying instances of the prediction that deviate from expected data or a general pattern. A difficulty in anomaly detection is that the system must define the boundary between ordinary data and anomalous data to accurately classify the data as ordinary or anomalous. The line between ordinary and anomalous may be difficult to determine with cases approaching a boundary and based on the specific application. For example, small variations may trigger an identification of an anomaly in the data while relatively larger deviations may be considered normal in less sensitive applications. The disclosed systems and methods may provide solutions to detect anomalies to more accurately and quickly determine whether a model needs to be retrained. If data would be inapplicable or would corrupt the model by reducing the quality of the input data or training process (e.g., due to missing values, outliers, inconsistent formatting, incorrect labels, noisy data, etc.) that data may be automatically dropped and the source of that data may be blocked from providing data that would be used to train the model. This reflects an improvement in the process of training and deploying a model that is accurate and specific to the type of prediction sought. In particular, this provides an improvement in the field of model training, which provides a practical application.

In other applications, the anomaly detections processes described herein may be used to provide enhanced security to the overall computing system by detecting malicious attacks on network security. For example, the system may take proactive measures to remediate danger by detecting the source address associated with potentially malicious packets and dropping potentially malicious packets. This provides an improvement in network security by dropping potentially malicious packets and blocking future traffic from the source address of the potentially malicious source address.

The systems and methods disclosed herein (e.g., the triage chat model 114) may also be used to analyze text to form the predictions. In particular, the systems and methods described herein include a combination of elements that are utilized in a specific manner for automatically performing automated processes based on technological efficiency, which provides a specific improvement over prior art systems resulting in improved computer processing for faster automated processing functions. For example, the systems and method may apply robotic process automation for digital transformation of the data based on specific criteria to interpret text and unstructured data using text processing software techniques. The interpretation of the text may be implemented using the models described herein including unsupervised learning techniques or supervised learning techniques. The processor may track how much memory and/or processing time has been allocated to perform a function and the system may be trained to automatically detect and identify processes eligible for increased efficiencies based on existing inefficiencies in the process.

For example, the machine learning models may use unsupervised learning to identify and characterize hidden structures of unstructured and unlabeled content data, or supervised techniques that operate on labeled content data and include instructions informing the system which outputs are related to specific input values. In such instances, software processing can rely on iterative training techniques and training data to configure neural networks with an understanding of individual words, phrases, subjects, sentiments, and parts of speech.

Supervised learning software systems are trained using content data that is labeled or "tagged." During training, the supervised software systems learn the best mapping function between a known data input and expected known output (e.g., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a computed probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar words together to accelerate the derivation and verification of an underneath common intent—e.g., ascertain or derive a new classification or subject, and not just classification into an existing subject or classification. Unsupervised learning software systems are also used for association rules mining to discover relationships between features from content data.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

Neural networks may be trained using training set content data that comprise sample tokens, phrases, sentences, paragraphs, or documents for which desired subjects, content sources, interrogatories, or sentiment values are known. A labeling analysis may be performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data may then be fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the computed probability and the known certainty. Then parameters to the neural network are adjusted (e.g., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to,"

as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, speech patterns, tone, timbre, cadence, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (e.g., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm ("UMAP") can be applied to reduce dimensionality while maintaining essential information.

Prior to conducting a subject analysis to ascertain subject identifiers in the content data (e.g., topics or subjects addressed in the content data) or interaction driver identifiers in the content data (e.g., reasons why the customer initiated the interaction with the provider, such as the reason underlying a support request), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency ("TF-IDF") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (e.g., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers.

In one embodiment, the subject classification analysis is performed on the content data using a Latent Dirichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (e.g., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recomputed, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (e.g., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model may be evaluated according to three categories, including a "good match" where the support request reason(s) are identified by the top words in the subject vector (e.g., the words with the highest weight or frequency), a "moderate" match where the support request reason(s) are identified by the second tier of words in the subject vector (e.g., words six to ten), and a "poor" match where, for instance, the top words in a subject vector do not match or identify the reasons the support request was initiated.

Alternatively, instead of selecting a pre-determined number of communication elements, post-clustering concentration analysis can analyze the subject vectors to identify communication elements that are included in several subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is thus turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two-unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analysis.

In another example, a number of subject identifiers may be substantially different, with some subjects having orders of magnitude fewer subject vectors than do other subjects. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are computed for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The TF-IDF is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the TF-IDF might indicate that the term "password" carries significant weight within content data. To the extent any of the subjects identified by a natural language processing analysis include the term "password," that subject can be assigned more weight by the content driver software service.

The content data can be visualized and subject to a reduction into two-dimensional data using a UMAP to generate a cluster graph visualizing a plurality of clusters. The content driver software service feeds the two-dimensional data into a DBSCAN and identify a center of each cluster of the plurality of clusters. The process may, using the two dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service can also incorporate Part of Speech ("POS") tagging software code that assigns words a part of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (e.g., a content source).

The systems and methods disclosed herein may utilize deployed models (e.g., machine learning models, neural networks, predictive models, etc.) such as the triage chat model 114 to make predictions about errors in the system 100. The use of specially trained models realizes a number of improvements over traditional methods of error detection and correction, including more accurate error detection and corrective action generation. Further, the systems and methods disclosed herein lead to faster training times and a more accurate model.

The systems and methods disclosed herein reflect an improvement in the functioning of a computer or an improvement to other technology or a technical field by leveraging a knowledge base such as knowledge base 116 to allow the triage chat model 114 to determine an error exists, pinpoint the location of the error, and identify corrective actions for the error. These corrective actions may be automatically initiated to correct errors without user input.

In addition, the systems and methods utilize a particular machine or manufacture such as, for example, computing system 102 executing the triage chat model 114. The computing system 102 is integral to effectuating the improvements disclosed herein by facilitating the collection of data in the knowledge base 116 that is used to train and subsequently retrain the triage chat model 114. Further, the systems and methods disclosed herein utilize a combination of software and hardware that include, for example, a physical circuit, which is a machine or manufacture.

FIG. 11 illustrates an example computing system 1100 suitable for implementing various embodiments as described herein. As shown, the computing system 1100 comprises a computer 1102, which is representative of any type of physical and/or virtualized computing device. Examples of the computer 1102 include, but are not limited to, a server, workstation, laptop, mobile device, smartphone, tablet computer, mainframe, distributed computing system, compute cluster, media device, camera, gaming device, a portable digital assistant (PDA), a system-on-chip (SoC), a pager, a television, a wearable device, a virtual machine (VM), container, or any other device with processing capabilities. In one embodiment, the computer 1102 is representative of some or all of the components of the system 100, e.g., the computing system 102, servers 104, user devices 106, and/or network appliances 108. More generally, the computing system 1100 is configured to implement all systems, methods, apparatuses, media, and embodiments disclosed herein.

As shown, the computer 1102 includes one or more processors 1104, one or more memories 1106, one or more non-transitory storage media 1110, one or more communications interfaces 1112, one or more positioning devices 1114, one or more input devices 1116, and one or more output devices 1118 communicably coupled via an interconnect 1108. A power source 1120, such as a power supply, battery, or any type of power source may provide power to the computer 1102.

The processor 1104 is representative of any type of processing circuit. For example, the processor 1104 may be a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, a digital signal processor, analog to digital converter, digital to analog converter, and the like.

The memory 1106 is representative of any computer readable medium to store data, code, or other information. The memory 1106 may include volatile memory, such as volatile Random Access Memory (RAM) including a cache area for the temporary storage of data. The memory 1106 may also include non-volatile memory, which can be embedded and/or may be removable. The non-volatile memory can additionally or alternatively include an electrically erasable programmable read-only memory (EEPROM), flash memory or the like. The storage medium 1110 is representative of any type of computer readable medium to store data, code, or other information. Examples of storage media 1110 include solid state drives, hard drives, Redundant Array of Independent Disks (RAID) drives, memory pools, USB storage devices, and the like.

The memory 1106 and storage medium 1110 can store any number and type of computer-executable instructions executed by the processor 1104 to implement the functions of the computer 1102 described herein. For example, the memory 1106 may include such applications as a web browser application and/or a mobile P2P payment system client application. These applications also typically provide a graphical user interface (GUI) on a display that allows the user to communicate with the computer 1102, and, for example a mobile banking system, and/or other devices or systems. In one embodiment, when the user decides to enroll in a mobile banking program, the user downloads or otherwise obtains the mobile banking system client application from a mobile banking system, or from a distinct application server. In other embodiments, the user interacts with a mobile banking system via a web browser application in addition to, or instead of, the mobile P2P payment system client application. Similarly, the memory 1106 and/or storage medium 1110 may be used to store data such as cached data, files for user accounts, user profiles, account balances, transaction histories, files downloaded or received from other devices, and any other data items.

The interconnect 1108 is representative of any type of circuitry to connect the components of the computer 1102. For example, the interconnect 1108 can include or represent, a system bus, a universal serial bus (USB) interface, a peripheral component interconnect (PCI), a Peripheral Component Interconnect-enhanced (PCIe), compute express link (CXL) interconnects, Universal Chiplet Interconnect Express (UCIe) interface, PCI-UCIe interconnects, an interface serial peripheral interconnects (SPIs), integrated interconnects (I2Cs), a high-speed interface connecting the processor 1104 to the memory 1106, individual electrical connections among the components, and electrical conductive traces on a motherboard common to some or all of the above-described components of the computer 1102. As discussed herein, the interconnect 1108 may operatively couple various components with one another, or in other words, electrically connects those components, either directly or indirectly—by way of intermediate component (s)—with one another.

The one or more input devices 1116 are representative of any type of input device for receiving input, such as a keypad, keyboard, touchscreen, touchpad, microphone, camera, fingerprint sensor, mouse, joystick, other pointer device, button, soft key, and the like. The one or more output devices 1118 are representative of any type of device for outputting information, such as a monitor, speaker, haptic feedback module, printer, and the like.

The computer 1102 may use the communications interface 1112 to communicate with one or more other devices 1124 via a network 1122. The communications interface 1112 allows the computer 1102 to communicate with and conduct transactions with other devices and systems, such as the other devices 1124. The communications interface 1112 may be a wired and/or a wireless interface. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communications interface 1112, which can be or include a radio-frequency transceiver, a Bluetooth device, Wi-Fi device, a Near-Field Communication (NFC) device, and other wireless transceivers. In addition, a positioning device 1114 such as a Global Positioning System (GPS) device may be included for navigation and location-related data exchanges, ingoing and/or outgoing. Wi-Fi networks use radio technologies called IEEE 802.11x (a, b, g, n, ac, ax, etc.) to provide secure, reliable, fast wireless connectivity. A Wi-Fi network connects computers to each other, to the Internet, and to wired networks (which use IEEE 802.3-related media and functions). Communications may also and/or alternatively be conducted via wired connections using the communications interface 1112, e.g., using USB, Ethernet, and other physically connected modes of data transfer. The network 1122 may be any one of, or the combination of, wired and/or wireless networks including without limitation a direct connection, a private network (e.g., an intranet), a public network (e.g., the Internet), a Personal Area Network (PAN), a Local Area Network (LAN), a Wide Area Network (WAN), a wireless network, a cellular network, and other communications networks.

The computer 1102 is configured to use the communications interface 1112 as, for example, a network interface to communicate with one or more other devices on a network such as network 1122. In this regard, the computer 1102 utilizes the wireless communications interface 1112 as an antenna operatively coupled to a transmitter and a receiver (together a “transceiver”) included with the communications interface 1112. The communications interface 1112 is configured to provide signals to and receive signals from the transmitter and receiver, respectively. The signals may include signaling information in accordance with the air interface standard of the applicable cellular system of a wireless telephone network. In this regard, the computer 1102 may be configured to operate with one or more air interface standards, communication protocols, modulation types, and access types. By way of illustration, the computer 1102 may be configured to operate in accordance with any of a number of first, second, third, fourth, fifth-generation communication protocols and/or the like. For example, the as a smartphone, the computer 1102 be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The computer 1102 may also be configured to operate in accordance with non-cellular communication mechanisms, such as via a wireless local area network (WLAN) or other communication/data networks.

The communications interface 1112 may also include a payment network interface. The payment network interface may include software, such as encryption software, and hardware, such as a modem, for communicating information to and/or from one or more devices on a network. For example, the computer 1102 may be configured so that it can be used as a credit or debit card by, for example, wirelessly communicating account numbers or other authentication information to a terminal of the network. Such communication could be performed via transmission over a wireless communication protocol such as the NFC protocol.

The computer 1102 may be under the control of any suitable operating system (not pictured). Example operating systems include, but are not limited to, Linux® operating systems, UNIX®, Windows® operating systems, macOS®, iOS®, Android® and any other type of operating system.

The computer 1102 as illustrated diagrammatically represents at least one example of a possible implementation, where alternatives, additions, and modifications are possible for performing some or all of the described methods, operations, and functions. Although shown separately, in some embodiments, two or more computers 1102, systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

Aspects of the present disclosure are described herein with reference to flowchart illustrations and/or block diagrams of computer-implemented methods and computing systems according to embodiments of the disclosure. It will be understood that each block of the flowchart illustrations and/or block diagrams, and combinations of blocks in the flowchart illustrations and/or block diagrams, can be implemented by computer readable program instructions that may be provided to a processor of a computer or other programmable data processing apparatus (the term “apparatus” includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts to carry out an embodiment.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present disclosure and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described to explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A method, comprising:

receiving, by a first application executing on a processor, a natural language request comprising an indication of an error associated with a second application or a system;

analyzing, by a large language model (LLM) executing on the processor, the natural language request to identify a plurality of components associated with the second application or the system, wherein the plurality of components comprises at least one of an application, a server, a network, or a network appliance;

causing, by the first application, one or more diagnostic tests to be executed to verify the existence of the error, wherein the one or more diagnostic tests comprise transmitting one or more machine-executable requests to at least one runtime instance of the second application and another component of the plurality of components;

determining, by the LLM based on results of the one or more diagnostic tests, a first component of the plurality of components causing the error, wherein the first component is identified based on a failure or non-response of the respective component to which the one or more machine-executable requests were transmitted;

determining, by the LLM based on a plurality of user profiles, a first user profile of the plurality of user profiles associated with the first component;

transmitting, by the first application to the first user profile, a notification comprising an indication of the error and the first component;

generating, by the LLM based on a knowledge base, a corrective action associated with the first component of the plurality of components, wherein the corrective action comprises the LLM generating modified source code for the second application; and initiating, by the first application, deployment of the modified source code to the second application to correct the error.

2. The method of claim 1, wherein the knowledge base comprises: (i) a plurality of documents, (ii) a plurality of audio recordings, (iii) a plurality of video recordings, (iv) a plurality of text transcripts, (v) the plurality of user profiles, and (vi) a plurality of error logs.

3. The method of claim 1, wherein the LLM is trained based on the plurality of documents, the plurality of audio recordings, the plurality of video recordings, the plurality of text transcripts, the plurality of user profiles, and the plurality of error logs.

4. The method of claim 3, further comprising:

receiving, by the first application: (i) additional documents, (ii) additional audio recordings, (iii) additional video recordings, (iv) additional text transcripts, (v) additional user profiles, and (vi) additional error logs;

storing, by the first application in the knowledge base, (i) the additional documents, (ii) the additional audio recordings, (iii) the additional video recordings, (iv) the additional text transcripts, (v) the additional user profiles, and (vi) the additional error logs; and retraining the LLM based on the knowledge base.

5. The method of claim 1, further comprising:

receiving, by the LLM, an indication of a first version of a document associated with the error;

determining, by the LLM, a plurality of versions of the document associated with the error, each of the plurality of versions of the document generated subsequent to the first version of the document;

generating, by the LLM, a summary comprising a plurality of changes to the first version of the document; and outputting the summary for display on a display device.

6. The method of claim 1, wherein generating the corrective action comprises:

determining, by the LLM based on a transcript in the knowledge base, another error associated with the first component; and determining, by the LLM based on transcript, the corrective action based on an indication of the corrective action in the transcript.

7. A non-transitory computer-readable storage medium, the computer-readable storage medium including instructions that when executed by a processor, cause the processor to:

receive, by a first application, a natural language request comprising an indication of an error associated with a second application or a system;

analyze, by a large language model (LLM), the natural language request to identify a plurality of components associated with the second application or the system, wherein the plurality of components comprises at least one of an application, a server, a network, or a network appliance;

cause, by the first application, one or more diagnostic tests to be executed to verify the existence of the error, wherein the one or more diagnostic tests comprise transmitting one or more machine-executable requests to at least one runtime instance of the second application and another component of the plurality of components;

determine, by the LLM based on results of the one or more diagnostic tests, a first component of the plurality of components causing the error, wherein the first component is identified based on a failure or non-response of the respective component to which the one or more machine-executable requests were transmitted;

determine, by the LLM based on a plurality of user profiles, a first user profile of the plurality of user profiles associated with the first component;

transmit, by the first application to the first user profile, a notification comprising an indication of the error and the first component;

generate, by the LLM based on a knowledge base, a corrective action associated with the first component of the plurality of components, wherein the corrective action comprises the LLM generating modified source code for the second application; and initiate, by the first application, deployment of the modified source code to the second application to correct the error.

8. The computer-readable storage medium of claim 7, wherein the knowledge base comprises: (i) a plurality of documents, (ii) a plurality of audio recordings, (iii) a plurality of video recordings, (iv) a plurality of text transcripts, (v) the plurality of user profiles, and (vi) a plurality of error logs.

9. The computer-readable storage medium of claim 7, wherein the LLM is trained based on the plurality of documents, the plurality of audio recordings, the plurality of video recordings, the plurality of text transcripts, the plurality of user profiles, and the plurality of error logs.

10. The computer-readable storage medium of claim 9, wherein the instructions further cause the processor to:

receive, by the first application: (i) additional documents, (ii) additional audio recordings, (iii) additional video recordings, (iv) additional text transcripts, (v) additional user profiles, and (vi) additional error logs;

store, by the first application in the knowledge base, (i) the additional documents, (ii) the additional audio recordings, (iii) the additional video recordings, (iv) the additional text transcripts, (v) the additional user profiles, and (vi) the additional error logs; and retrain the LLM based on the knowledge base.

11. The computer-readable storage medium of claim 7, wherein the instructions further cause the processor to:

receive, by the LLM, an indication of a first version of a document associated with the error;

determine, by the LLM, a plurality of versions of the document associated with the error, each of the plurality of versions of the document generated subsequent to the first version of the document;

generate, by the LLM, a summary comprising a plurality of changes to the first version of the document; and output the summary for display on a display device.

12. The computer-readable storage medium of claim 7, wherein the instructions to generate the corrective action comprise instructions to:

determine, by the LLM based on a transcript in the knowledge base, another error associated with the first component; and determine, by the LLM based on transcript, the corrective action based on an indication of the corrective action in the transcript.

13. An apparatus, comprising:

a processor; and a memory storing instructions that, when executed by the processor, cause the processor to:

receive, by a first application, a natural language request comprising an indication of an error associated with a second application;

analyze, by a large language model (LLM), the natural language request to identify a plurality of components associated with the second application, wherein the plurality of components comprises at least one of an application, a server, a network, or a network appliance;

cause, by the first application, one or more diagnostic tests to be executed to verify the existence of the error, wherein the one or more diagnostic tests comprise transmitting one or more machine-executable requests to at least one runtime instance of the second application and another component of the plurality of components;

determine, by the LLM based on results of the one or more diagnostic tests, a first component of the plurality of components causing the error, wherein the first component is identified based on a failure or non-response of the respective component to which the one or more machine-executable requests were transmitted;

determine, by the LLM based on a plurality of user profiles, a first user profile of the plurality of user profiles associated with the first component;

transmit, by the first application to the first user profile, a notification comprising an indication of the error and the first component;

generate, by the LLM based on a knowledge base, a corrective action associated with the first component of the plurality of components, wherein the corrective action comprises the LLM generating modified source code for the second application; and initiate, by the first application, deployment of the modified source code to the second application.

14. The apparatus of claim 13, wherein the knowledge base comprises: (i) a plurality of documents, (ii) a plurality of audio recordings, (iii) a plurality of video recordings, (iv) a plurality of text transcripts, (v) a plurality of user profiles, and (vi) a plurality of error logs.

15. The apparatus of claim 13, wherein the LLM is trained based on the plurality of documents, the plurality of audio recordings, the plurality of video recordings, the plurality of text transcripts, the plurality of user profiles, and the plurality of error logs.

16. The apparatus of claim 15, wherein the instructions further cause the processor to:

receive, by the first application: (i) additional documents, (ii) additional audio recordings, (iii) additional video recordings, (iv) additional text transcripts, (v) additional user profiles, and (vi) additional error logs;

store, by the first application in the knowledge base, (i) the additional documents, (ii) the additional audio recordings, (iii) the additional video recordings, (iv) the additional text transcripts, (v) the additional user profiles, and (vi) the additional error logs; and retrain the LLM based on the knowledge base.

17. The apparatus of claim 13, wherein the instructions further cause the processor to:

receive, by the LLM, an indication of a first version of a document associated with the error;

determine, by the LLM, a plurality of versions of the document associated with the error, each of the plurality of versions of the document generated subsequent to the first version of the document;

generate, by the LLM, a summary comprising a plurality of changes to the first version of the document; and output the summary for display on a display device.

* * * * *